(12) United States Patent
Hashimoto

(10) Patent No.: US 11,773,229 B2
(45) Date of Patent: Oct. 3, 2023

(54) HARD COAT LAMINATED FILM

(71) Applicant: RIKEN TECHNOS CORPORATION, Tokyo (JP)

(72) Inventor: Taketo Hashimoto, Tokyo (JP)

(73) Assignee: RIKEN TECHNOS CORPORATION

( * ) Notice: Subject to any disclaimer, the term of this patent is extended or adjusted under 35 U.S.C. 154(b) by 862 days.

(21) Appl. No.: 16/612,646

(22) PCT Filed: Apr. 5, 2018

(86) PCT No.: PCT/JP2018/014594
§ 371 (c)(1),
(2) Date: Nov. 11, 2019

(87) PCT Pub. No.: WO2018/207513
PCT Pub. Date: Nov. 15, 2018

(65) Prior Publication Data
US 2020/0061983 A1    Feb. 27, 2020

(30) Foreign Application Priority Data

May 10, 2017  (JP) .................................. 2017-093521

(51) Int. Cl.
*C08J 7/04*  (2020.01)
*G02B 1/14*  (2015.01)
(Continued)

(52) U.S. Cl.
CPC .............. *C08J 7/042* (2013.01); *B32B 27/18* (2013.01); *B32B 27/30* (2013.01); *B32B 27/34* (2013.01);
(Continued)

(58) Field of Classification Search
CPC ... C08J 7/042; C08J 7/046; C08J 7/043; C08J 2433/14; G02B 1/14; B32B 27/18;
(Continued)

(56) References Cited

U.S. PATENT DOCUMENTS

2008/0004392 A1* 1/2008 Qiu .......................... C09D 7/47
524/487
2011/0189470 A1   8/2011 Iizuka et al.
(Continued)

FOREIGN PATENT DOCUMENTS

CN    107405901 A   11/2017
EP      3272527 A1    1/2018
(Continued)

OTHER PUBLICATIONS

Machine translation of JP 2000-052472 to English from Espacenet (Year: 2000).*
(Continued)

Primary Examiner — Alicia J Weydemeyer
Assistant Examiner — Laura B Figg
(74) Attorney, Agent, or Firm — Bracewell LLP; Brad Y. Chin

(57) ABSTRACT

A first embodiment is a hard coat laminated film which sequentially includes a first hard coat layer and a transparent resin film layer from the surface layer side, and wherein the first hard coat layer is formed from a coating material that contains 100 parts by mass of (A) a copolymer of (a1) a polyfunctional (meth)acrylate and (a2) a polyfunctional thiol and 0.01-7 parts by mass of (B) a water repellent agent, while containing no inorganic particles. A second embodiment is a hard coat laminated film which sequentially includes a first hard coat layer and a transparent resin film layer from the surface layer side, and wherein: the first hard coat layer is formed from a coating material that contains (A) a copolymer of (a1) a polyfunctional (meth)acrylate and (a2) a polyfunctional thiol and (B) a water repellent agent, while containing no inorganic particles; and the surface of the first hard coat layer exhibits high abrasion resistance (steel wool resistance) as examined by a test under prede-
(Continued)

termined conditions with use of a JSPS-type tester in accordance with JIS L0849 (2013).

17 Claims, 3 Drawing Sheets

(51) Int. Cl.
| | |
|---|---|
| *B32B 27/18* | (2006.01) |
| *B32B 27/30* | (2006.01) |
| *B32B 27/34* | (2006.01) |
| *B32B 27/36* | (2006.01) |
| *C08J 7/043* | (2020.01) |
| *C08J 7/046* | (2020.01) |

(52) U.S. Cl.
CPC ............ *B32B 27/365* (2013.01); *C08J 7/043* (2020.01); *C08J 7/046* (2020.01); *G02B 1/14* (2015.01); *B32B 2250/05* (2013.01); *B32B 2250/24* (2013.01); *B32B 2250/40* (2013.01); *B32B 2307/412* (2013.01); *B32B 2307/536* (2013.01); *B32B 2307/73* (2013.01); *C08J 2433/14* (2013.01)

(58) Field of Classification Search
CPC ....... B32B 27/30; B32B 27/34; B32B 27/365; B32B 2250/05; B32B 2250/24; B32B 2250/40; B32B 2307/412; B32B 2307/536; B32B 2307/73
See application file for complete search history.

(56) References Cited

U.S. PATENT DOCUMENTS

| | | | |
|---|---|---|---|
| 2012/0168074 A1* | 7/2012 | Kim | B29C 45/14811 156/306.6 |
| 2018/0067234 A1 | 3/2018 | Fujimoto et al. | |
| 2018/0072029 A1* | 3/2018 | Nakashima | C08J 7/043 |

FOREIGN PATENT DOCUMENTS

| | | |
|---|---|---|
| EP | 3550335 A1 | 10/2019 |
| JP | 2000052472 A * | 2/2000 |
| JP | 2007254650 A | 10/2007 |
| JP | 2010211150 A | 9/2010 |
| JP | 2011201087 A | 10/2011 |
| JP | 2011213989 A | 10/2011 |
| JP | 2013204011 A | 10/2013 |
| JP | 2013208896 A | 10/2013 |
| JP | 2013213200 A | 10/2013 |
| JP | 2013231167 A | 11/2013 |
| JP | 2015113414 A | 6/2015 |
| JP | 2016011365 A | 1/2016 |
| JP | 2016060839 A | 4/2016 |
| JP | 2016172424 A | 9/2016 |
| JP | 2018047686 A | 3/2018 |
| KR | 20040094153 A | 11/2004 |
| WO | 2008047620 A1 | 4/2008 |
| WO | 2013146778 A1 | 10/2013 |
| WO | 2016147424 A1 | 9/2016 |
| WO | 2016147733 A1 | 9/2016 |
| WO | 2016163478 A1 | 10/2016 |
| WO | 2017002779 A1 | 1/2017 |

OTHER PUBLICATIONS

Yao et al. "Fluorinated poly(meth)acrylate: Synthesis and Properties" Sep. 30, 2014 Elsevier Polymer 55 (2014) 66197-6211 (Year: 2014).*
CN201880025497.9 First Office Action dated May 24, 2021, 26 pgs.
JP2018-72808 Office Action dated Feb. 28, 2022, 9 pgs.
PCTJP2019002639 International Preliminary Report on Patentability dated Aug. 27, 2020, 17 pgs.
TW107113647 First Office Action dated Aug. 25, 2021, 16 pages.
PCT/JP2018/014596 International Search Report dated Jun. 19, 2018; 2 pgs.
EP19757134.2 Extended European Search Report dated Oct. 21, 2021, 10 pgs.
CN201980008450.6 First Office Action dated Mar. 14, 2022, 37 pgs.
CN201880025497.9 Second Office Action dated Nov. 22, 2021, 31 pgs.
EP18799110.4 Supplementary Extended Search Report dated Dec. 11, 2020, 10 pgs.
JP2015-113414A English Translation via espacenet. accessed May 13, 2021 (Year: 2015).
PCT/JP2018/014594 International Preliminary Report on Patentability dated Nov. 21, 2019, 19 pgs.
KR10-2019-7035493 First Office Action dated Dec. 29, 2022, 9 pgs.
PCT/JP2019/002639 International Search Report dated Apr. 23, 2019, 2 pgs.

* cited by examiner

HARD COAT LAMINATED FILM

CROSS REFERENCE TO RELATED APPLICATIONS

This application claims the benefit of and priority to PCT/JP2018/014594, filed on Apr. 5, 2018, entitled (translation), "HARD COAT LAMINATED FILM," which claims the benefit of and priority to Japanese Patent Application No. 017-093521, filed on May 10, 2017, which are hereby incorporated by reference in their entirety into this application.

BACKGROUND

Embodiments relate to a hard coat laminated film. More specifically, embodiments relate to a hard coat laminated film excellent in abrasion resistance (at least steel wool resistance).

DESCRIPTION OF THE RELATED ART

In recent years, touch panels which are installed on image display devices such as liquid crystal displays, plasma displays, and electroluminescent displays and can perform input by touching the display with a finger and a pen while watching the display have become widespread.

Conventionally, glass-based articles have been used as display face plates of touch panels since these meet the required properties such as heat resistance, dimensional stability, high transparency, high surface hardness, and high stiffness. Meanwhile, glass has disadvantages that glass exhibits low impact resistance and is likely to crack; glass exhibits low processability; it is difficult to handle glass; glass has a high specific gravity and is heavy; and glass hardly meets the requirements for curved and flexible displays. Hence, materials to replace glass have been actively studied, and a large number of hard coat laminated films in which a hard coat excellent in abrasion resistance is formed on the surface of transparent resin film substrates such as triacetyl cellulose, polyethylene terephthalate, polycarbonate, polymethyl methacrylate, and norbornene polymer have been proposed (see, for example, Patent Literature 1). However, the abrasion resistance is still insufficient, and a hard coat laminated film which is not damaged even if it is repeatedly scratched with steel wool and the like is required.

CITATION LIST

Patent Literature

PATENT LITERATURE 1: JP-A-2013-208896

SUMMARY

An object of the various embodiments is to provide a hard coat laminated film excellent in abrasion resistance (at least steel wool resistance). A further object of the various embodiments is to provide a hard coat laminated film excellent in at least one of crack resistance, surface appearance, transparency, color tone, surface hardness, and bending resistance and preferably excellent substantially in all of these in addition to abrasion resistance.

The aspects of the various embodiments for solving the above-mentioned problems are as follows.

According to at least one embodiment, there is provided a hard coat laminated film sequentially including a first hard coat layer and a transparent resin film layer from a surface layer side, wherein the first hard coat layer is formed from a coating material that contains 100 parts by mass of (A) a copolymer of (a1) a polyfunctional (meth)acrylate and (a2) a polyfunctional thiol, and 0.01 to 7 parts by mass of (B) a water repellent agent, the coating material containing no inorganic particles.

According to another embodiment, there is provided a hard coat laminated film sequentially including a first hard coat layer and a transparent resin film layer from a surface layer side, wherein the first hard coat layer is formed from a coating material that contains (A) a copolymer of (a1) a polyfunctional (meth)acrylate and (a2) a polyfunctional thiol, and (B) a water repellent agent while containing no inorganic particles, and the hard coat laminated film satisfies the following property (i): (i) no scratches are found when the hard coat laminated film is placed on a Gakushin-type tester in accordance with HS L0849:2013 so that the first hard coat is on the surface side; a steel wool of #0000 is subsequently attached to a rubbing finger of the Gakushin-type tester and a load of 500 g is then applied; and, after 9000 reciprocating rubbings of the surface of the test piece under conditions that the moving speed of the rubbing finger is 300 mm/min and the moving distance is 30 mm, the rubbed portion is visually observed.

According to an embodiment, the hard coat laminated film sequentially includes a first hard coat, a third hard coat, and a transparent resin film layer from a surface side, wherein the third hard coat is formed from a coating material containing inorganic particles.

According to an embodiment, a sulfur content in (A) the copolymer is 0.1 to 12% by mass.

According to an embodiment, a mass average molecular weight of (A) the copolymer in terms of polystyrene determined from a differential molecular weight distribution curve measured by gel permeation chromatography using tetrahydrofuran as a mobile phase is 5,000 to 200,000.

According to an embodiment, (B) the water repellent agent contains a (meth)acryloyl group-containing fluorine-based water repellent agent.

According to an embodiment, there is provided an article including the hard coat laminated film according to various embodiments.

The hard coat laminated film according to various embodiments is excellent in abrasion resistance (at least steel wool resistance and preferably both steel wool resistance and water contact angle after being wiped with cotton). A preferred hard coat laminated film according to various embodiments is excellent in at least one of crack resistance, surface appearance, transparency, color tone, surface hardness, and bending resistance and preferably excellent substantially in all of these in addition to abrasion resistance. For this reason, the hard coat laminated film according to various embodiments can be suitably used as an article or a member of an article, for example, image display devices (including image display devices having a touch panel function and image display devices not having a touch panel function) such as liquid crystal displays, plasma displays, and electroluminescent displays; members such as display face plates, transparent conductive substrates, and housings thereof; and particularly display face plates of image display devices having a touch panel function.

DETAILED DESCRIPTION

Figure 1:
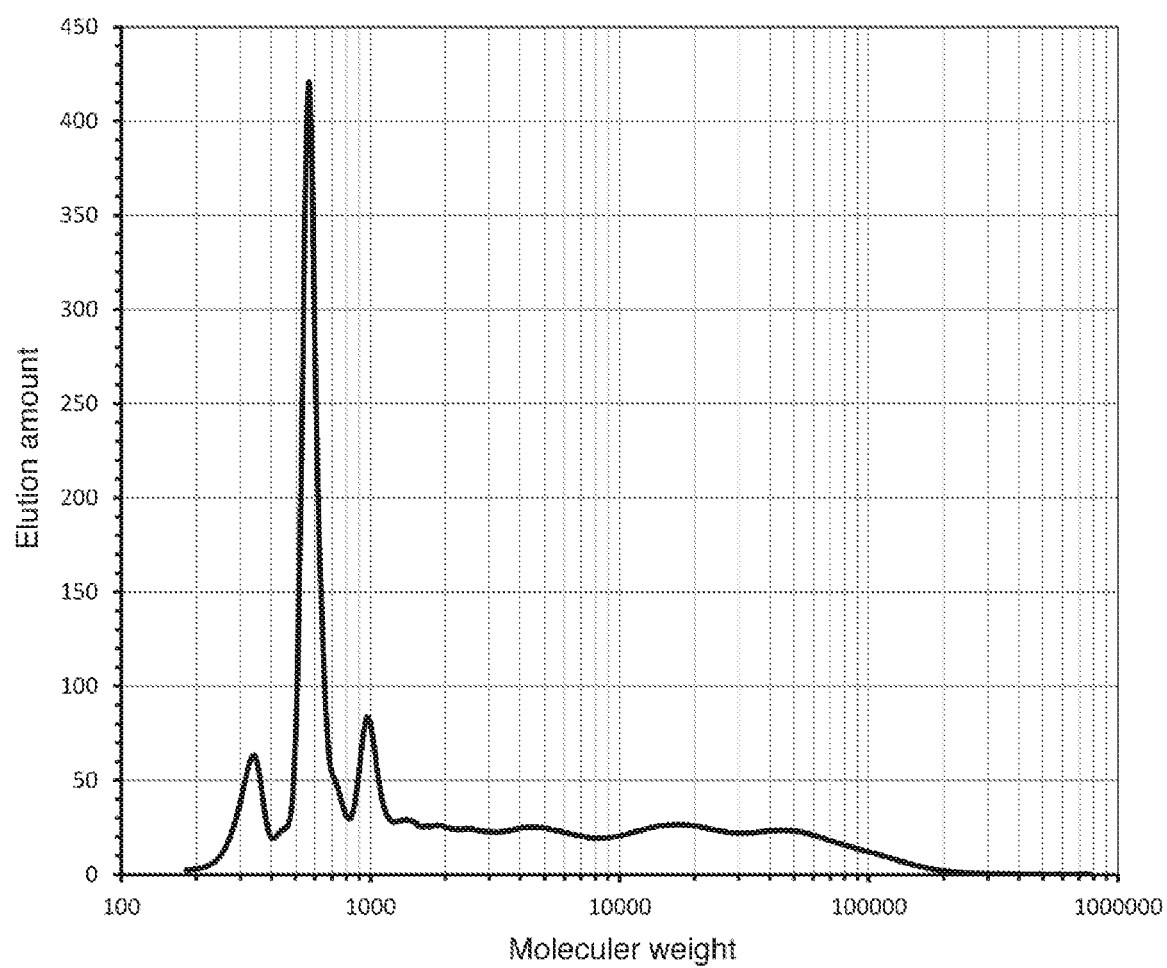
FIG. 1 is a GPC curve of a component (A-1) used in Examples.

In the present specification, the term "film" is used interchangeably or intersubstitutably with "sheet". In the present specification, the terms "film" and "sheet" are used for those that can be industrially wound in a roll shape. The term "plate" is used for those that can not be industrially wound in a roll shape. In the present specification, the term "resin" is used as a term including resin mixtures containing two or more kinds of resins and resin compositions containing components other than resins as well. In addition, in the present specification, sequentially laminating one layer on another layer includes both laminating those layers directly and laminating those layers with one or more other layers such as an anchor coat interposed therebetween.

In the present specification, the term "or more" relating to a numerical range is used in the meaning of a certain numerical value or more than a certain numerical value. For example, 20% or more means 20% or more than 20%. In the present specification, the term "or less" relating to a numerical range is used in the meaning of a certain numerical value or less than a certain numerical value. For example, 20% or less means 20% or less than 20%. Furthermore, the symbol "to" ("–") relating to a numerical range is used in the meaning of a certain numerical value, more than the certain numerical value and less than other certain numerical value, or the other certain numerical value. Here, the other certain numerical value is a numerical value greater than the certain numerical value. For example, 10 to 90% means 10%, more than 10% and less than 90%, or 90%.

All numerical values used in the present specification and claims should be understood as being modified by the term "about" in the description other than Examples or unless otherwise specified. Without intending to limit the application of the doctrine of equivalents with respect to the claims, the respective numerical values should be interpreted in view of significant digits and by applying conventional rounding techniques.

The hard coat laminated film according to various embodiments sequentially has a first hard coat and a transparent resin film layer from the surface layer side.

Here, the "surface side" means to be closer to the outer surface (display surface in the case of being used in an image display device) when an article formed from a hard coat laminated film having a multilayer structure is subjected to field use.

First Hard Coat

According to an embodiment, the first hard coat usually forms the surface of the hard coat laminated film. The first hard coat forms a touch surface in a case in which the hard coat laminated film according to various embodiments is used as a display face plate of an image display device having a touch panel function. The first hard coat exerts favorable abrasion resistance and acts so that the hard coat laminated film is not damaged even if it is repeatedly rubbed with steel wool and the like.

The first hard coat is formed from a coating material which contains (A) a copolymer of (a1) a polyfunctional (meth)acrylate and (a2) a compound having two or more thiol groups in one molecule (polyfunctional thiol) and (B) a water repellent agent but does not contain inorganic particles. The first hard coat is preferably formed from a coating material which contains 100 parts by mass of (A) a copolymer of (a1) a polyfunctional (meth)acrylate and (a2) a compound having two or more thiol groups in one molecule and 0.01 to 7 parts by mass of (B) a water repellent agent but does not contain inorganic particles.

Inorganic particles (for example, silica (silicon dioxide); metal oxide particles such as aluminum oxide, zirconia, titania, zinc oxide, germanium oxide, indium oxide, tin oxide, indium tin oxide, antimony oxide, and cerium oxide; metal fluoride particles such as magnesium fluoride and sodium fluoride; metal sulfide particles; metal nitride particles; and metal particles) are greatly effective in enhancement of the hardness of the hard coat. On the other hand, the interaction of inorganic particles with a resin component such as component (A) is weak, and this causes insufficient abrasion resistance of the hard coat laminated film. Hence, the first hard coat is formed not to contain inorganic particles.

Here, "not to contain" inorganic particles means not to contain inorganic particles in a significant amount. In the field of coating material for hard coat formation, a significant amount of inorganic particles is usually about 1 part by mass or more with respect to 100 parts by mass of the copolymer of component (A). Consequently, "not to contain" inorganic particles can also be rephrased as the amount of inorganic particles is usually 0 parts by mass or more and less than 1 part by mass, preferably 0.5 parts by mass or less, more preferably 0.1 part by mass or less, and still more preferably 0.01 parts by mass or less with respect to 100 parts by mass of the copolymer of component (A).

(A) Copolymer of (a1) Polyfunctional (Meth)Acrylate and (a2) Polyfunctional Thiol The copolymer of component (A) is formed from (a1) a polyfunctional (meth)acrylate and (a2) a polyfunctional thiol. Component (A) is usually a copolymer having a highly branched structure, a so-called dendrimer structure since both of component (a1) and component (a2) are polyfunctional monomers. Incidentally, in the present specification, (meth)acrylate means acrylate or methacrylate. The copolymer of component (A) acts to form a hard coat by being polymerized and cured by active energy rays such as ultraviolet rays and electron beams.

(a1) Polyfunctional (Meth)Acrylate

The polyfunctional (meth)acrylate of component (a1) is a (meth)acrylate having two or more (meth)acryloyl groups in one molecule. The number of (meth)acryloyl groups in one molecule of component (a1) is preferably 3 or more, more preferably 4 or more, and still more preferably 5 or more from a viewpoint of forming the structure of the copolymer of component (A) into a so-called dendrimer structure. On the other hand, the number of (meth)acryloyl groups in one molecule may be usually 20 or less and preferably 12 or less from a viewpoint of crack resistance.

In an embodiment, examples of the polyfunctional (meth)acrylate as component (a1) include (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane, and 2,2'-bis(4-(meth)acryloyloxypolypropyleneoxyphenyl)propane; (meth)acryloyl group-containing trifunctional reactive monomers such as trimethylolpropane tri(meth)acrylate, trimethylolethane tri(meth)acrylate, and ethoxylated trimethylolpropane tri (meth)acrylate; (meth)acryloyl group-containing tetrafunctional reactive monomers such as ditrimethylolpropane tetra (meth)acrylate and pentaerythritol tetramethacrylate; (meth)acryloyl group-containing hexafunctional reactive monomers such as dipentaerythritol hexaacrylate; (meth)acryloyl group-containing octafunctional reactive monomers such as tripentaerythritol octaacrylate; and polymers (oligomers and prepolymers) containing one or more kinds of these as constituent monomers. In an embodiment, examples of the polyfunctional (meth)acrylate as component (a1) include those having two or more (meth)acryloyl groups in one molecule, which are prepolymers or oligomers such as polyurethane (meth)acrylate, polyester (meth)acrylate, polyacrylic (meth)acrylate, polyepoxy (meth)acrylate, polyalkylene glycol poly(meth)acrylate, and polyether (meth)acrylate.

As the polyfunctional (meth)acrylate of component (a1), one kind of these or a mixture of two or more kinds thereof can be used.

(a2) Polyfunctional Thiol

The polyfunctional thiol of component (a2) is a compound having two or more thiol groups in one molecule. The number of thiol groups in one molecule of component (a2) may be preferably 3 or more and more preferably 4 or more from a viewpoint of forming the structure of the copolymer of component (A) into a so-called dendrimer structure. On the other hand, the number of thiol groups in one molecule may be usually 20 or less and preferably 12 or less from a viewpoint of crack resistance of the hard coat laminated film. The thiol group possessed by the polyfunctional thiol of component (a2) may be preferably a secondary thiol group from a viewpoint of balance between reactivity and handleability.

The polyfunctional thiol of component (a2) may be one having one or two or more polymerizable functional groups other than thiol groups such as a (meth)acryloyl group, a vinyl group, an epoxy group, and an isocyanate group in one molecule. In the present specification, a compound having two or more thiol groups and having two or more (meth)acryloyl groups in one molecule is component (a2) but is not component (a1).

Examples of the polyfunctional thiol as component (a2) include compounds having two thiol groups in one molecule such as 1,2-ethanedithiol, ethylene glycol bis(3-mercaptopropionate), diethylene glycol bis(3-mercaptopropionate), 1,4-bis(3-mercaptobutyryloxy)butane, and tetraethylene glycol bis(3-mercaptopropionate); compounds having three thiol groups in one molecule such as 1,3,5-tris(3-mercaptobutyryloxyethyl)-1,3,5-triazine-2,4,6(1H,3H,5H)-trione, trimethylolpropane tris(3-mercaptobutyrate), trimethylolethane tris(3-mercaptobutyrate), and tris[(3-mercaptopropionyloxy)ethyl] isocyanurate; compounds having four thiol groups in one molecule such as pentaerythritol tetrakis(3-mercaptopropionate) and pentaerythritol tetrakis(3-mercaptobutyrate); compounds having six thiol groups in one molecule such as dipentaerythritol hexakis(3-mercaptopropionate); and polymers (oligomers and prepolymers) containing one or more kinds of these as constituent monomers. As the polyfunctional thiol of component (a2), one kind of these or a mixture of two or more kinds thereof can be used.

The copolymer of component (A) may contain a structural unit derived from a monomer copolymerizable with component (a1) or component (a2) in addition to these components to the extent to which the object of the various embodiments is not impaired. The copolymerizable monomer is usually a compound having a carbon-carbon double bond and is typically a compound having an ethylenic double bond.

The content of the structural unit derived from the polyfunctional (meth)acrylate of component (a1) in the copolymer of component (A) (hereinafter abbreviated as the (a1) content in some cases) may be usually 50% by mole or more, preferably 60% by mole or more, more preferably 70% by mole or more, and still more preferably 80% by mole or more with respect to 100% by mole of the sum of the structural units derived from the polymerizable monomers from a viewpoint of forming the structure of the copolymer of component (A) into a so-called dendrimer structure and from a further viewpoint of the abrasion resistance of the hard coat laminated film to be formed. On the other hand, the (a1) content may be usually 99% by mole or less, preferably 97% by mole or less, more preferably 95% by mole or less, and still more preferably 93% by mole or less from a viewpoint of forming the structure of the copolymer of component (A) into a so-called dendrimer structure and from further viewpoints of the crack resistance and handling property of the hard coat laminated film to be formed. In an embodiment, the (a1) content may be usually 50% by mole or more and 99% by mole or less, preferably 50% by mole or more and 97% by mole or less, 50% by mole or more and 95% by mole or less, 50% by mole or more and 93% by mole or less, 60% by mole or more and 99% by mole or less, 60% by mole or more and 97% by mole or less, 60% by mole or more and 95% by mole or less, 60% by mole or more and 93% by mole or less, 70% by mole or more and 99% by mole or less, 70% by mole or more and 97% by mole or less, 70% by mole or more and 95% by mole or less, 70% by mole or more and 93% by mole or less, 80% by mole or more and 99% by mole or less, 80% by mole or more and 97% by mole or less, 80% by mole or more and 95% by mole or less, or 80% by mole or more and 93% by mole or less with respect to 100% by mole of the sum of the structural units derived from the polymerizable monomers.

The content of the structural unit derived from the polyfunctional thiol of component (a2) in the copolymer of component (A) (hereinafter abbreviated as the (a2) content in some cases) may be usually 1% by mole or more, preferably 3% by mole or more, more preferably 5% by mole or more, and still more preferably 7% by mole or more with respect to 100% by mole of the sum of the structural units derived from the polymerizable monomers from a viewpoint of forming the structure of the copolymer of component (A) into a so-called dendrimer structure and from further viewpoints of the crack resistance and handling property of the hard coat laminated film to be formed. On the other hand, the (a2) content may be usually 50% by mole or less, preferably 40% by mole or less, more preferably 30% by mole or less, and still more preferably 20% by mole or less from a viewpoint of forming the structure of the copolymer of component (A) into a so-called dendrimer structure and from a further viewpoint of the abrasion resistance of the hard coat laminated film to be formed. In an embodiment, the (a2) content may be usually 1% by mole or more and 50% by mole or less, preferably 1% by mole or more and 40% by mole or less, 1% by mole or more and 30% by mole or less, 1% by mole or more and 20% by mole or less, 3% by mole or more and 50% by mole or less, 3% by mole or more and 40% by mole or less, 3% by mole or more and 30% by mole or less, 3% by mole or more and 20% by mole or less, 5% by mole or more and 50% by mole or less, 5% by mole or more and 40% by mole or less, 5% by mole or more and 30% by mole or less, 5% by mole or more and 20% by mole or less, 7% by mole or more and 50% by mole or less, 7% by mole or more and 40% by mole or less, 7% by mole or more and 30% by mole or less, or 7% by mole or more and 20% by mole or less with respect to 100% by mole of the sum of the structural units derived from the polymerizable monomers.

Here, the sum of the (a1) content and the (a2) content may be usually 80% by mole or more, preferably 90% by mole or more, more preferably 95% by mole or more, and still more preferably 99% by mole or more, or 100% by mole or less with respect to 100% by mole of the sum of the structural units derived from the polymerizable monomers. Incidentally, the "polymerizable monomers" mean component (a1), component (a2), and monomers copolymerizable with these. The copolymerizable monomer is usually a compound having a carbon-carbon double bond and is typically a compound having an ethylenic double bond.

The sulfur content in the copolymer of component (A) may be usually 0.1 to 12% by mass, preferably 0.5 to 10% by mass, more preferably 1 to 7% by mass, and still more preferably 1.5 to 5% by mass from a viewpoint of setting the (a2) content into the preferred range. In an embodiment, the sulfur content may be 0.1 to 10% by mass, 0.1 to 7% by mass, 0.1 to 5% by mass, 0.5 to 12% by mass, 0.5 to 7% by mass, 0.5 to 5% by mass, 1 to 12% by mass, 1 to 10% by mass, 1 to 5% by mass, 1.5 to 12% by mass, 1.5 to 10% by mass, or 1.5 to 7% by mass.

Here, the sulfur content is a value measured by atomic absorption spectrophotometry for a measurement sample obtained by performing ashing (wet decomposition) of a sample using a mixed acid of nitric acid and hydrochloric acid (volume ratio 8:2) with a microwave apparatus, then adding an aqueous solution of hydrochloric acid to the ash, filtering the mixture, and adjusting the volume of the filtrate with purified water. At this time, yttrium was used as an internal standard. In addition, it should be noted that sulfur is likely to bond with iron and the like and thus to generate a precipitate and this is required to be prevented. Specifically, the measurement of the sulfur content by atomic absorption spectrophotometry was performed according to the following procedure.

(1) Pretreatment of Sample

A biaxially oriented polyethylene terephthalate resin film which had a thickness of 50 μm and was subjected to an easy release treatment was coated with the copolymer of component (A) using an applicator so that the thickness after drying became 2 μm, and dried at a temperature of 100° C. for 1 hour to obtain a coat. In a polytetrafluoroethylene ashing vessel "XP-1500 plus control" (trade name) of a type capable of measuring the temperature and pressure available from CEM Corporation, 0.2 g of a sample taken from the coat was placed, 5 mL of a mixed acid of nitric acid 1.42 as a reagent for precision analysis (UGR) available from Kanto Chemical Co., Inc. and hydrochloric acid for atomic absorption analysis available from Kanto Chemical Co., Inc. at a volume ratio of 8:2 was added into the vessel, these were mixed together, the mixture was left to stand still at normal temperature for 12 hours, and then set in a microwave apparatus "MARS 5" (trade name) available from CEM Corporation, and the first heat treatment was performed. After completion of the treatment, the polytetrafluoroethylene ashing vessel was left to stand until the internal temperature thereof reached normal temperature, and then the first degassing was performed. The polytetrafluoroethylene ashing vessel was again set in the microwave apparatus, and the second heat treatment was performed. After completion of the treatment, the polytetrafluoroethylene ashing vessel was left to stand until the internal temperature thereof reached normal temperature, and then the second degassing was performed. Incidentally, the first heat treatment was performed under conditions that the pressure and temperature were raised to a pressure of 40 PSI and a temperature of 130° C. at an output of 400 W over 10 minutes and held for 3 minutes, then the pressure and temperature were raised to a pressure of 60 PSI and a temperature of 150° C. at an output of 400 W over 10 minutes and held for 5 minutes, then the pressure and temperature were raised to a pressure of 100 PSI and a temperature of 160° C. at an output of 400 W over 10 minutes and held for 5 minutes, then the pressure and temperature were raised to a pressure of 250 PSI and a temperature of 180° C. at an output of 400 W over 10 minutes and held for 3 minutes, and then the pressure and temperature were raised to a pressure of 550 PSI and a temperature of 200° C. at an output of 400 W over 10 minutes and held for 7 minutes. The second heat treatment was performed under conditions that the pressure and temperature were raised a pressure of 600 PSI and a temperature of 230° C. at an output of 400 W over 20 minutes and held for 10 minutes. Subsequently, 10 mL of a hydrochloric acid aqueous solution of composed of hydrochloric acid for atomic absorption analysis available from Kanto Chemical Co., Inc. and purified water at a volume ratio of 1:1 was added into the vessel, these were mixed together, the mixture was left to stand still at normal temperature for 6 hours, and then filtered using filter paper "Quantitative Filter Paper No. 5A" (trade name) available from Advantec Toyo Kabushiki Kaishax, and the volume of the filtrate was adjusted to 50 mL with purified water to obtain a treated sample. At this time, an yttrium standard solution for atomic absorption analysis available from Fujifilm Wako Pure Chemical Corporation was added as an internal standard so that the yttrium concentration in the treated sample was 0.02 ppm.

(2) Atomic Absorption Analysis

Using the measurement sample prepared by diluting the pretreated sample obtained in (1) above with purified water 100-fold and an ICP-OES apparatus "ARCOS" (trade name) available from SPECTRO Analytical Instruments Inc., the atomic absorbance measurement was performed under conditions of a plasma power of 1400 W, a plasma gas flow rate of 13.0 liters/minute, an auxiliary gas flow rate of 1.0 liters/minute, a nebulizer gas flow rate of 0.8 liters/minute, a torch position of 3.0 mm, and a measurement wavelength of 180.731 nm. The sulfur content was determined based on a calibration curve made by the following method (3). The analysis program used was "Smart Analyzer Vision Software" (trade name) developed by SPECTRO Analytical Instruments Inc. Incidentally, it should be noted that the dilution degree of the pretreated sample obtained in (1) above with purified water is required to be appropriately adjusted so that the measured value of the measurement sample is interpolated to the plots of the calibration curve.

(3) Making of Calibration Curve (3-1) Preparation of Sample for Calibration Curve To a predetermined amount (1, 2, 5, 10, or 20 mL) of a sulfur standard solution for ICP atomic emission spectrophotometry (sulfur concentration: 1000 mg/liter) available from Kanto Chemical Co., Inc., 10 mL of a hydrochloric acid aqueous solution composed of hydrochloric acid for atomic absorption analysis available from Kanto Chemical Co., Inc. and purified water at a volume ratio of 1:1 was added, and the volume of the mixture was adjusted to 50 mL with purified water to obtain a sample for calibration curve. At this time, an yttrium standard solution for atomic absorption analysis available from Fujifilm Wako Pure Chemical Corporation was added as an internal standard so that the yttrium concentration in the sample for calibration curve was 0.02 ppm.

(3-2) Atomic Absorption Analysis

The atomic absorbance was measured in the same manner as in (2) above using the sample for calibration curve obtained in (3-1) above.

(3-3) Making of Calibration Curve

The calibration curve was made by the least squares method from the relation between the sulfur concentration in the sample for calibration curve and the atomic absorbance of the sample for calibration curve.

The mass average molecular weight (Mw) of the copolymer of component (A) in terms of polystyrene determined from the differential molecular weight distribution curve (hereinafter abbreviated as GPC curve in some cases) measured by gel permeation chromatography (hereinafter abbreviated as GPC in some cases) using tetrahydrofuran as the mobile phase may be preferably 5,000 or more, more preferably 8,000 or more, and still more preferably 10,000 or more from a viewpoint of the balance between the abrasion resistance and crack resistance of the hard coat laminated film to be formed. On the other hand, this mass average molecular weight (Mw) may be preferably 200,000 or less, more preferably 100,000 or less, and still more preferably 50,000 or less from a viewpoint of the coating properties of the coating material containing the copolymer of component (A). In an embodiment, the mass average molecular weight (Mw) of the copolymer of component (A) may be preferably 5,000 or more and 200,000 or less and more preferably 5,000 or more and 100,000 or less, 5,000 or more and 50,000 or less, 8,000 or more and 200,000 or less, 8,000 or more and 100,000 or less, 8,000 or more and 50,000 or less, 10,000 or more and 200,000 or less, 10,000 or more and 100,000 or less, or 10,000 or more and 50,000 or less.

The Z average molecular weight (Mz) of the copolymer of component (A) in terms of polystyrene determined from the GPC curve using tetrahydrofuran as the mobile phase may be preferably 5,000 or more, more preferably 10,000 or more, and still more preferably 30,000 or more from a viewpoint of the balance between the abrasion resistance and crack resistance of the hard coat laminated film to be formed. On the other hand, the Z average molecular weight (Mz) may be preferably 200,000 or less, more preferably 150,000 or less, and still more preferably 120,000 or less from a viewpoint of the coating properties of the coating material containing the copolymer of component (A). In an embodiment, the Z average molecular weight (Mz) of the copolymer of component (A) may be preferably 5,000 or more and 200,000 or less and more preferably 5,000 or more and 150,000 or less, 5,000 or more and 120,000 or less, 10,000 or more and 200,000 or less, 10,000 or more and 150,000 or less, 10,000 or more and 120,000 or less, 30,000 or more and 200,000 or less, 30,000 or more and 150,000 or less, or 30,000 or more and 120,000 or less.

The measurement of GPC can be performed using a high performance liquid chromatography system "HLC-8320" (trade name) (system including degasser, liquid pump, autosampler, column oven, and RI (differential refractive index) detector) available from Tosoh Corporation as a system; two Shodex GPC columns "KF-806L" (trade name), one Shodex GPC column "KF-802" (trade name), and one Shodex GPC column "KF-801" (trade name) for a total of four by being connected in the order of KF-806L, KF-806L, KF-802, and KF-801 from the upstream side as GPC columns; and tetrahydrofuran (not containing stabilizer) for high performance liquid chromatography available from Fujifilm Wako Pure Chemical Corporation as a mobile phase; under conditions of a flow rate of 1.0 ml/min, a column temperature of 40° C., a sample concentration of 1 mg/ml, and a sample injection volume of 100 microliters. The elution amount at each retention volume can be determined from the amount detected by the RI detector on the assumption that there is no molecular weight dependency of the refractive index of the measurement sample. In addition, the calibration curve from retention volume to molecular weight in terms of polystyrene can be made using standard polystyrene "EasiCal PS-1" (trade name) (Plain A molecular weights 6375000, 573000, 117000, 31500, and 3480; Plain B molecular weights 2517000, 270600, 71800, 10750, and 705) available from Agilent Technology, Inc. As the analysis program, "TOSOH HLC-8320 GPC EcoSEC" (trade name) available from Tosoh Corporation can be used. Incidentally, for further information on the GPC theory and actual measurement, reference books such as "Size Exclusion Chromatography, high performance Liquid Chromatography of Polymers, author: MORI Sadao, First Edition, Dec. 10, 1991" published by Kyoritsu Shuppan Co., Ltd. can be made reference to.

The differential molecular weight distribution curve of a copolymer that is the component (A-1) used in Examples described later is illustrated in FIG. 1. Three clear peaks are acknowledged in the relatively low molecular weight region, and the molecular weights in terms of polystyrene at these peak top positions are 340, 570, and 970 in this order from the low molecular weight side. In addition, a plurality of overlapping and broad peaks are acknowledged on the high molecular weight side of these three peaks. The molecular weight of this component on the highest molecular weight side in terms of polystyrene is acknowledged to be around 200,000. Moreover, the entire mass average molecular weight is 12,000, the entire number average molecular weight is 940, and the entire Z average molecular weight is 73,000.

(B) Water Repellent Agent

The water repellent agent of component (B) acts to enhance the abrasion resistance, finger slidability, resistance to fouling (or stain) and wipeability against fouling (or stain) of the hard coat laminated film to be formed.

Examples of the water repellent agent include wax-based water repellent agents such as paraffin wax, polyethylene wax, and acrylic-ethylene copolymer wax; silicon-based water repellent agents such as silicone oil, silicon resins, polydimethylsiloxane, and alkyl alkoxysilanes; and fluorine-containing water repellent agents such as fluoropolyether-based water repellent agents and fluoropolyalkyl-based water repellent agents.

Among these, as the water repellent agent of component (B), a fluorine-containing water repellent agent is preferable from viewpoints of the abrasion resistance and water repellent performance of the hard coat laminated film to be formed. As the water repellent agent of component (B), a water repellent agent which is a fluorine-containing water repellent agent and contains a (meth)acryloyl group (hereinafter referred to as "(meth)acryloyl group-containing fluorine-based water repellent agent") is more preferable from viewpoints of the abrasion resistance and water repellent performance of the hard coat laminated film to be formed and from a further viewpoint of preventing the troubles that component (B) bleeds out as component (B) chemically bonds or strongly interacts with the copolymer of component (A). Here, the (meth)acryloyl group-containing fluorine-based water repellent agent is a compound having one or more (meth)acryloyl groups in the molecule and one or more, preferably three or more, more preferably five or more fluorine-carbon bonds (typically, a structure in which one or two or more hydrogen atoms of an organic functional group such as a hydrocarbon group are substituted with a fluorine atom) in the molecule.

Examples of the (meth)acryloyl group-containing fluorine-based water repellant agent include a (meth)acryloyl group-containing fluoroether-based water repellent agent, a (meth)acryloyl group-containing fluoroalkyl-based water repellent agent, a (meth)acryloyl group-containing fluoroalkenyl-based water repellent agent, a (meth)acryloyl group-containing fluoropolyether-based water repellent agent, a (meth)acryloyl group-containing fluoropolyalkyl-based water repellent agent, and a (meth)acryloyl group-containing fluoropolyalkenyl-based water repellent agent.

As the water repellent agent of component (B), a water repellent agent containing a compound having a (meth)acryloyl group and a fluoropolyether group in the molecule (hereafter, abbreviated as a (meth)acryloyl group-containing fluoropolyether-based water repellent agent) is still more preferable. As the water repellent agent of component (B), a mixture of an acryloyl group-containing fluoropolyether-based water repellent agent and a methacryloyl group-containing fluoropolyether-based water repellent agent is most preferable from viewpoints of exerting favorable abrasion resistance, water repellency, and bleed-out preventing property while keeping high transparency of the hard coat laminated film to be formed by appropriately controlling the chemical bond or interaction between component (B) and the copolymer of component (A).

As the water repellent agent of component (B), one kind of these or a mixture of two or more kinds thereof can be used.

The (meth)acryloyl group-containing fluorine-based water repellent agent is clearly distinguished from component (a1) in that it has one or more fluorine-carbon bonds in the molecule. In the present specification, a compound having two or more (meth)acryloyl groups in one molecule and one or more fluorine-carbon bonds in the molecule is classified into component (B).

The (meth)acryloyl group-containing fluoropolyether-based water repellent agent is clearly distinguished from component (a1) in that it has a fluoropolyether group in the molecule. In the present specification, a compound having two or more (meth)acryloyl groups in one molecule and a fluoropolyether group is component (B).

The amount of the water repellent agent of component (B) blended in the coating material for first hard coat formation can be appropriately determined from a viewpoint of achieving sufficient abrasion resistance of the hard coat laminated film to be formed, particularly favorable property (i).

The amount of the water repellent agent of component (B) blended may be usually 7 parts by mass or less, preferably 4 parts by mass or less, more preferably 2 parts by mass or less with respect to 100 parts by mass of component (A) from a viewpoint of preventing the troubles that component (B) bleeds out. On the other hand, the amount of the water repellent agent of component (B) blended may be usually 0.01 part by mass or more, preferably 0.05 parts by mass or more, more preferably 0.1 part by mass or more, and still more preferably 0.2 parts by mass or more from a viewpoint of attaining the effect by component (B). The amount of the water repellent agent of component (B) blended is usually 0.01 part by mass or more and 7 parts by mass or less and may be preferably 0.01 part by mass or more and 4 parts by mass or less, 0.01 part by mass or more and 2 parts by mass or less, 0.05 parts by mass or more and 7 parts by mass or less, 0.05 parts by mass or more and 4 parts by mass or less, 0.05 parts by mass or more and 2 parts by mass or less, 0.1 part by mass or more and 7 parts by mass or less, 0.1 part by mass or more and 4 parts by mass or less, 0.1 part by mass or more and 2 parts by mass or less, 0.2 parts by mass or more and 7 parts by mass or less, 0.2 parts by mass or more and 4 parts by mass or less, or 0.2 parts by mass or more and 2 parts by mass or less.

It is preferable that the coating material for first hard coat formation further contains a compound having two or more isocyanate groups (—N=C=O) in one molecule and/or a photopolymerization initiator from a viewpoint of improving the curability thereof by active energy rays.

Examples of the compound having two or more isocyanate groups in one molecule include methylene bis-4-cyclohexyl isocyanate; polyisocyanates such as trimethylolpropane adduct product of tolylene diisocyanate, trimethylolpropane adduct product of hexamethylene diisocyanate, trimethylolpropane adduct product of isophorone diisocyanate, isocyanurate product of tolylene diisocyanate, isocyanurate product of hexamethylene diisocyanate, isocyanurate product of isophorone diisocyanate, and biuret product of hexamethylene diisocyanate; and urethane cross-linking agents such as blocked type isocyanates of the polyisocyanates. As the compound having two or more isocyanate groups in one molecule, one kind of these or a mixture of two or more kinds thereof can be used. In addition, at the time of crosslinking, a catalyst such as dibutyltin dilaurate or dibutyltin diethylhexoate may be added, if necessary.

Examples of the photopolymerization initiator include benzophenone-based compounds such as benzophenone, methyl-o-benzoylbenzoate, 4-methylbenzophenone, 4,4'-bis (diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyObenzophenone, and 2,4,6-trimethylbenzophenone; benzoin-based compounds such as benzoin, benzoin methyl ether, benzoin ethyl ether, benzoin isopropyl ether, and benzyl methyl ketal; acetophenone-based compounds such as acetophenone, 2,2-dimethoxy-2-phenylacetophenone, and 1-hydroxycyclohexyl phenyl ketone; anthraquinone-based compounds such as methyl anthraquinone, 2-ethyl anthraquinone, and 2-amyl anthraquinone; thioxanthone-based compounds such as thioxanthone, 2,4-diethylthioxanthone and 2,4-diisopropylthioxanthone; alkylphenone-based compounds such as acetophenone dimethyl ketal; triazine-based compounds; biimidazole-based compounds; acyl phosphine oxide-based compounds; titanocene-based compounds; oxime ester-based compounds; oxime phenyl acetate-based compounds; hydroxy ketone-based compounds; and aminobenzoate-based compounds. As the photopolymerization initiator, one kind of these or a mixture of two or more kinds thereof can be used.

As the photopolymerization initiator, it is preferable to use two or more kinds of acetophenone-based photopolymerization initiators, for example, 1-hydroxy-cyclohexyl-phenyl ketone and 2-hydroxy-1-{4-[4-(2-hydroxy-2-methyl-propionyl)-benzyl]phenyl}-2-methyl-propan-1-one in combination. Such a combined use makes it possible to sufficiently cure the hard coat while suppressing the coloration of the hard coat.

The coating material for first hard coat formation can contain one or two or more kinds of additives such as an antistatic agent, a surfactant, a leveling agent, a thixotropic agent, a fouling (or stain) inhibitor, a printability improver, an antioxidant, a weather resistant stabilizer, a light resistant stabilizer, an ultraviolet absorber, a heat stabilizer, organic particles, and an organic colorant, if desired.

The coating material for first hard coat formation may contain a solvent, if desired, in order to dilute the coating material to a concentration at which coating is facilitated. The solvent is not particularly limited as long as it does not react with component (A), component (B), or any other optional components or does not catalyze (promote) the self reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, one kind of these or a mixture of two or more kinds thereof can be used.

The coating material for first hard coat formation can be obtained by mixing and stirring these components.

The method for forming the first hard coat using the coating material for first hard coat formation is not particularly limited, and a known web coating method can be used. Examples of the method include roll coating, gravure coating, reverse coating, roll brushing, dip coating, spray coating, spin coating, air knife coating, and die coating.

The thickness of the first hard coat may be usually 5 µm or more, preferably 8 µm or more, more preferably 10 µm or more, and still more preferably 12 µm or more from a viewpoint of satisfying the abrasion resistance of the hard coat laminated film to be formed, particularly the property (i), and the viewpoint of the surface hardness. On the other hand, the thickness of the first hard coat may be usually 60 µm or less, preferably 30 µm or less, more preferably 25 µm or less, and still more preferably 20 µm or less from viewpoints of favorably keeping the bending resistance of the hard coat laminated film of the various embodiments and easily handling the hard coat laminated film as a film roll. In an embodiment, the thickness of the first hard coat may be usually 5 µm or more and 60 µm or less, preferably 5 µm or more and 30 µm or less, 5 µm or more and 25 µm or less, 5 µm or more and 20 µm or less, 8 µm or more and 60 µm or less, 8 µm or more and 30 µm or less, 8 µm or more and 25 µm or less, 8 µm or more and 20 µm or less, 10 µm or more and 60 µm or less, 10 µm or more and 30 µm or less, 10 µm or more and 25 µm or less, 10 µm or more and 20 µm or less, 12 µm or more and 60 µm or less, 12 µm or more and 30 µm or less, 12 µm or more and 25 µm or less, or 12 µm or more and 20 µm or less.

Second Hard Coat

The hard coat laminated film of the various embodiments preferably sequentially has a first hard coat, a transparent resin film layer, and a second hard coat from the surface layer side. By forming the second hard coat, both the force to curl the hard coat laminated film to one side (hereinafter abbreviated as curling force in some cases) and the force to curl the hard coat laminated film to the other side work. The occurrence of curling can be then suppressed as these two curling forces are offset each other to zero.

In addition, in recent years, a touch panel having a two-layer structure in which a touch sensor is directly formed on the back side of a display face plate (so-called one glass solution) has been proposed for the purpose of saving the weight of the image display device. A one plastic solution which substitutes the so-called one glass solution has also been proposed for further weight saving. In a case in which the hard coat laminated film of the various embodiments is used in one plastic solution which substitutes the so-called one glass solution, it becomes easy to impart suitable properties as a printing surface by forming the second hard coat.

The second hard coat is not particularly limited and can be formed by any method using any coating material.

The second hard coat is preferably formed from a coating material containing (A) a copolymer of (a1) a polyfunctional (meth)acrylate and (a2) a compound having two or more thiol groups in one molecule from a viewpoint of curl resistance. The second hard coat is more preferably formed from a coating material containing (A) a copolymer of (a1) a polyfunctional (meth)acrylate and (a2) a compound having two or more thiol groups in one molecule and (C) a leveling agent. The second hard coat is still more preferably formed from a coating material containing 100 parts by mass of (A) a copolymer of (a1) a polyfunctional (meth)acrylate and (a2) a compound having two or more thiol groups in one molecule and 0.01 to 10 parts by mass of (C) a leveling agent.

For the copolymer of component (A), those described above in the description of the coating material for first hard coat formation can be used. As the copolymer of component (A), one kind of these or a mixture of two or more kinds thereof can be used. As the copolymer of component (A), one the same as that used in the coating material for first hard coat formation is still more preferable from a viewpoint of curl resistance.

(C) Leveling Agent

It is preferable that the coating material for second hard coat formation contains a leveling agent from a viewpoint of smoothing the surface of the second hard coat.

Examples of the leveling agent include an acrylic leveling agent, a silicon-based leveling agent, a fluorine-based leveling agent, a silicone-acrylic copolymer-based leveling agent, a fluorine-modified acrylic leveling agent, a fluorine-modified silicon leveling agent, and leveling agents in which functional groups (for example, alkoxy groups such as a methoxy group and an ethoxy group, an acyloxy group, a halogen group, an amino group, a vinyl group, an epoxy group, a methacryloxy group, an acryloxy group, and an isocyanate group) are introduced into these. Among them, as the leveling agent of component (C), an acrylic leveling agent and a silicone acrylic copolymer-based leveling agent are preferable from a viewpoint of printability. As the leveling agent of component (C), one kind of these or a mixture of two or more kinds thereof can be used.

The amount of the leveling agent of component (C) blended may be usually 0.01 part by mass or more, preferably 0.1 part by mass or more, and more preferably 0.2 parts by mass or more with respect to 100 parts by mass of the copolymer of component (A) from a viewpoint of smoothing the surface of the second hard coat. On the other hand, the amount of the leveling agent of component (C) blended may be usually 10 parts by mass or less, preferably 7 parts by mass or less, more preferably 4 parts by mass or less, and still more preferably 2 parts by mass or less from a viewpoint of preventing the troubles that the leveling agent of component (C) bleeds out. In an embodiment, the amount of the leveling agent of component (C) blended may be usually 0.01 part by mass or more and 10 parts by mass or less, preferably 0.01 part by mass or more and 7 parts by mass or less, 0.01 part by mass or more and 4 parts by mass or less, 0.01 part by mass or more and 2 parts by mass or less, 0.1 part by mass or more and 10 parts by mass or less, 0.1 part by mass or more and 7 parts by mass or less, 0.1 part by mass or more and 4 parts by mass or less, 0.1 part by mass or more and 2 parts by mass or less, 0.2 parts by mass or more and 10 parts by mass or less, 0.2 parts by mass or more and 7 parts by mass or less, 0.2 parts by mass or more and 4 parts by mass or less, or 0.2 parts by mass or more and 2 parts by mass or less.

It is preferable that the coating material for second hard coat formation further contains a compound having two or more isocyanate groups (—N=C=O) in one molecule and/or a photopolymerization initiator from a viewpoint of improving the curability thereof by active energy rays.

For the compound having two or more isocyanate groups in one molecule, those described above in the description of the coating material for first hard coat formation can be used. As the compound having two or more isocyanate groups in one molecule, one kind of these or a mixture of two or more kinds thereof can be used.

For the photopolymerization initiator, those described above in the description of the coating material for first hard coat formation can be used. As the photopolymerization initiator, one kind of these or a mixture of two or more kinds thereof can be used.

The coating material for second hard coat formation can contain one or two or more kinds of additives such as an antistatic agent, a surfactant, a thixotropic agent, a fouling (or stain) inhibitor, a printability improver, an antioxidant, a weather resistant stabilizer, a light resistant stabilizer, an ultraviolet absorber, a heat stabilizer, a colorant, inorganic particles, and organic particles, if desired.

The coating material for second hard coat formation may contain a solvent, if desired, in order to dilute the coating material to a concentration at which coating is facilitated. The solvent is not particularly limited as long as it does not react with component (A), component (C), or any other optional components or does not catalyze (promote) the self reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, one kind of these or a mixture of two or more kinds thereof can be used.

The coating material for second hard coat formation can be obtained by mixing and stirring these components.

The method for forming the second hard coat using the coating material for second hard coat formation is not particularly limited, and a known web coating method can be used. Examples of the method include roll coating, gravure coating, reverse coating, roll brushing, dip coating, spray coating, spin coating, air knife coating, and die coating.

The thickness of the second hard coat is not particularly limited but may be usually 60 μm or less, preferably 30 μm or less, more preferably 25 μm or less, and still more preferably 20 μm or less from a viewpoint of bending resistance. On the other hand, the thickness of the second hard coat may be usually 5 μm or more, preferably 8 μm or more, more preferably 10 μm or more, and still more preferably 12 μm or more from a viewpoint of suppressing the curling force. In an embodiment, the thickness of the second hard coat may be usually 5 μm or more and 60 μm or less, preferably 5 μm or more and 30 μm or less, 5 μm or more and 25 μm or less, 5 μm or more and 20 μm or less, 8 μm or more and 60 μm or less, 8 μm or more and 30 μm or less, 8 μm or more and 25 μm or less, 8 μm or more and 20 μm or less, 10 μm or more and 60 μm or less, 10 μm or more and 30 μm or less, 10 μm or more and 25 μm or less, 10 μm or more and 20 μm or less, 12 μm or more and 60 μm or less, 12 μm or more and 30 μm or less, 12 μm or more and 25 μm or less, or 12 μm or more and 20 μm or less.

In addition, the thickness of the second hard coat may be the same as the thickness of the first hard coat from a viewpoint of the curl resistance of the hard coat laminated film.

Here, "the same thickness" should not be interpreted as the exactly same thickness in the physicochemically strict meaning. It should be interpreted as the same thickness within the range of fluctuation of process and quality control usually performed industrially. If the thicknesses are the same within the range of fluctuation of process and quality control usually performed industrially, the curl resistance of the hard coat laminated film can be favorably maintained. The thickness of the hard coat (after curing) can be controlled to fall within a fluctuation range of about −0.5 to +0.5 μm in process and quality control, and thus a thickness of 10 μm and a thickness of 11 μm should be interpreted as the same, for example, when the set thickness is 10.5 μm. "The same thickness" herein may be rephrased as "substantially the same thickness".

Third Hard Coat

The hard coat laminated film of the various embodiments preferably may sequentially have a first hard coat, a third hard coat, and a transparent resin film layer from the surface layer side.

The hard coat laminated film of the various embodiments more preferably may sequentially have a first hard coat, a third hard coat, a transparent resin film layer, and a second hard coat from the surface layer side.

The surface hardness of the first hard coat can be enhanced by forming the third hard coat.

The third hard coat is not particularly limited and can be formed by any method using any coating material.

As the coating material for third hard coat formation, a coating material containing (D) inorganic particles is preferable from a viewpoint of enhancing the surface hardness of the first hard coat. As the coating material for third hard coat formation, a coating material containing (F) an active energy ray curable resin and (D) inorganic particles is more preferable.

Here, "to contain" inorganic particles means to contain inorganic particles in a significant amount to enhance the hardness of hard coat. In the field of coating material for hard coat formation, a significant amount of inorganic particles to enhance the hardness of hard coat is usually about 5 parts by mass or more with respect to 100 parts by mass of the resin component in the coating material. Hence, "to contain" the inorganic particles of component (D) can also be rephrased as the amount of the inorganic particles is usually 5 parts by mass or more, preferably 30 parts by mass or more, more preferably 50 parts by mass or more, still more preferably 80 parts by mass or more, yet more preferably 100 parts by mass or more, and most preferably 120 parts by mass or more with respect to 100 parts by mass of the resin component in the coating material. Incidentally, the upper limit of the amount of the inorganic particles of component (D) is not particularly limited, but may be, for example, usually 1000 parts by mass or less, preferably 500 parts by mass or less, and still more preferably 300 parts by mass or less with respect to 100 parts by mass of the resin component in the coating material. In an embodiment, the amount of the inorganic particles of component (D) may be usually 5 parts by mass or more and 1000 parts by mass or less, preferably 5 parts by mass or more and 500 parts by mass or less, 5 parts by mass or more and 300 parts by mass or less, 30 parts by mass or more and 1000 parts by mass or less, 30 parts by mass or more and 500 parts by mass or less, 30 parts by mass or more and 300 parts by mass or less, 50 parts by mass or more and 1000 parts by mass or less, 50 parts by mass or more and 500 parts by mass or less, 50 parts by mass or more and 300 parts by mass or less, 80 parts by mass or more and 1000 parts by mass or less, 80 parts by mass or more and 500 parts by mass or less, 80 parts by mass or more and 300 parts by mass or less, 100 parts by mass or more and 1000 parts by mass or less, 100 parts by mass or more and 500 parts by mass or less, 100 parts by mass or more and 300 parts by mass or less, 120 parts by mass or more and 1000 parts by mass or less, 120 parts by mass or more and 500 parts by mass or less, or 120 parts by mass or more and 300 parts by mass or less with respect to 100 parts by mass of the resin component in the coating material.

(F) Active Energy Ray Curable Resin

The active energy ray curable resin of component (F) acts to form a hard coat by being polymerized and cured by active energy rays such as ultraviolet rays and electron beams.

Examples of the active energy ray curable resin of component (F) include polyfunctional (meth)acrylates, polyfunctional thiols, monomers copolymerizable with these, and polymers (prepolymers or oligomers) comprised of one or more kinds of these as constituent monomers. Examples of the polymer include a copolymer of a polyfunctional (meth)acrylate and a polyfunctional thiol.

For the polyfunctional (meth)acrylate, those described above as component (a1) in the description of the coating material for first hard coat formation can be used. As the polyfunctional thiol, those described above as component (a2) in the description of the coating material for first hard coat formation can be used.

Examples of the monomers copolymerizable with these include (meth)acryloyl group-containing monofunctional reactive monomers such as methyl (meth)acrylate, ethyl (meth)acrylate, n-butyl (meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth)acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth)acrylate, and trimethylsiloxyethyl methacrylate; and monofunctional reactive monomers such as N-vinyl pyrrolidone and styrene.

As component (F), one kind of these or a mixture of two or more kinds thereof can be used. Incidentally, in the present specification, "(meth)acrylate" means acrylate or methacrylate.

(D) Inorganic Particles

The inorganic particles of component (D) act to dramatically enhance the hardness of the hard coat laminated film of the various embodiments.

Examples of the inorganic particles include silica (silicon dioxide); metal oxide particles such as aluminum oxide, zirconia, titania, zinc oxide, germanium oxide, indium oxide, tin oxide, indium tin oxide, antimony oxide, and cerium oxide; metal fluoride particles such as magnesium fluoride and sodium fluoride; metal sulfide particles; metal nitride particles; and metal particles.

Among these, particles of silica and aluminum oxide are preferable and particles of silica are more preferable in order to obtain a hard coat having a higher surface hardness. Examples of commercially available products of silica particles include SNOWTEX (trade name) available from Nissan Chemical Corporation and Quartron (trade name) available from Fuso Chemical Co., Ltd.

For the purpose of enhancing the dispersibility of inorganic particles in the coating material and enhancing the surface hardness of the hard coat to be obtained, it is preferable to use those obtained by treating the surface of the inorganic particles with silane-based coupling agents such as vinylsilane and aminosilane; titanate-based coupling agents; aluminate-based coupling agents; organic compounds having reactive functional groups such as ethylenically unsaturated bonding groups such as a (meth)acryloyl group, a vinyl group, and an allyl group and an epoxy group; and surface treating agents such as fatty acid and fatty acid metal salts.

As the inorganic particles of component (D), one kind of these or a mixture of two or more kinds thereof can be used.

The average particle diameter of the inorganic particles of component (D) may be usually 300 nm or less, preferably 200 nm or less, and more preferably 120 nm or less from a viewpoint of maintaining the transparency of the hard coat and from a further viewpoint of reliably attaining the hardness improving effect. On the other hand, the lower limit of the average particle diameter is not particularly limited but is usually at most about 1 nm at the finest in available inorganic particles.

Incidentally, in the present specification, the average particle diameter of the inorganic particles is a particle diameter at which the cumulation from the smaller particle side is 50% by mass in the particle diameter distribution curve measured by the laser diffraction/scattering method. The average particle diameter of the inorganic particles can be calculated as a particle diameter at which the cumulation from the smaller particle side is 50% by mass in the particle diameter distribution curve measured using a laser diffraction/scattering particle size analyzer "MT3200 II" (trade name) available from Nikkiso Co., Ltd.

In the case of using the active energy ray curable resin of component (F) as a resin component in the coating material for third hard coat formation, the amount of the inorganic particles of component (D) blended may be usually 30 parts by mass or more, preferably 50 parts by mass or more, more preferably 80 parts by mass or more, still more preferably 100 parts by mass or more, and most preferably 120 parts by mass or more with respect to 100 parts by mass of component (F) from a viewpoint of the surface hardness of the hard coat. On the other hand, the amount of the inorganic particles of component (D) blended may be usually 300 parts by mass or less, preferably 250 parts by mass or less, and more preferably 200 parts by mass or less from a viewpoint of the transparency of the hard coat. In an embodiment, the amount of the inorganic particles of component (D) blended may be usually 30 parts by mass or more and 300 parts by mass or less, preferably 30 parts by mass or more and 250 parts by mass or less, 30 parts by mass or more and 200 parts by mass or less, 50 parts by mass or more and 300 parts by mass or less, 50 parts by mass or more and 250 parts by mass or less, 50 parts by mass or more and 200 parts by mass or less, 80 parts by mass or more and 300 parts by mass or less, 80 parts by mass or more and 250 parts by mass or less, 80 parts by mass or more and 200 parts by mass or less, 100 parts by mass or more and 300 parts by mass or less, 100 parts by mass or more and 250 parts by mass or less, 100 parts by mass or more and 200 parts by mass or less, 120 parts by mass or more and 300 parts by mass or less, 120 parts by mass or more and 250 parts by mass or less, or 120 parts by mass or more and 200 parts by mass or less with respect to 100 parts by mass of the active energy ray curable resin of component (F) (in the case of using the resin).

(C) LEVELING AGENT

It is preferable that the coating material for third hard coat formation further contains (C) a leveling agent from viewpoints of smoothing the surface of the third hard coat and facilitating the formation of the first hard coat.

For the leveling agent of component (C), those described above in the description of the coating material for second hard coat formation can be used.

Among these, an acrylic leveling agent and a silicone-acrylic copolymer-based leveling agent are preferable as the leveling agent of component (C) to be used in the coating material for third hard coat formation. As component (C), one kind of these or a mixture of two or more kinds thereof can be used.

In the case of using the active energy ray curable resin of component (F) as a resin component in the coating material for third hard coat formation, the amount of the leveling agent of component (C) blended may be usually 0.01 part by mass or more, preferably 0.1 part by mass or more, and more preferably 0.2 parts by mass or more with respect to 100 parts by mass of component (F) from viewpoints of smoothing the surface of the third hard coat and facilitating the formation of the first hard coat. On the other hand, the amount of the leveling agent of component (C) blended may be usually 1 part by mass or less, preferably 0.6 parts by mass or less, and more preferably 0.4 parts by mass or less from a viewpoint of being able to favorably applying the coating material for first hard coat formation on the third hard coat without being repelled. In an embodiment, the amount of the leveling agent of component (C) blended may be usually 0.01 part by mass or more and 1 part by mass or less and preferably 0.01 part by mass or more and 0.6 parts by mass or less, 0.01 part by mass or more and 0.4 parts by mass or less, 0.1 part by mass or more and 1 part by mass or less, 0.1 part by mass or more and 0.6 parts by mass or less, 0.1 part by mass or more and 0.4 parts by mass or less, 0.2 parts by mass or more and 1 part by mass or less, 0.2 parts by mass or more and 0.6 parts by mass or less, or 0.2 parts by mass or more and 0.4 parts by mass or less with respect to 100 parts by mass of the active energy ray curable resin of component (F) (in the case of using the resin).

It is preferable that the coating material for third hard coat formation further contains a compound having two or more isocyanate groups (—N=C=O) in one molecule and/or a photopolymerization initiator from a viewpoint of improving the curability thereof by active energy rays.

For the compound having two or more isocyanate groups in one molecule, those described above in the description of the coating material for first hard coat formation can be used. As the compound having two or more isocyanate groups in one molecule, one kind of these or a mixture of two or more kinds thereof can be used.

For the photopolymerization initiator, those described above in the description of the coating material for first hard coat formation can be used. As the photopolymerization initiator, one kind of these or a mixture of two or more kinds thereof can be used.

The coating material for third hard coat formation can contain one or two or more kinds of additives such as an antistatic agent, a surfactant, a thixotropic agent, a fouling (or stain) inhibitor, a printability improver, an antioxidant, a weather resistant stabilizer, a light resistant stabilizer, an ultraviolet absorber, a heat stabilizer, a colorant, and organic particles, if desired.

The coating material for third hard coat formation may contain a solvent, if desired, in order to dilute the coating material to a concentration at which coating is facilitated.

The solvent is not particularly limited as long as it does not react with component (F), component (D), or any other optional components or does not catalyze (promote) the self reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. Among these, 1-methoxy-2-propanol is preferable. As the solvent, one kind of these or a mixture of two or more kinds thereof can be used.

The coating material for third hard coat formation can be obtained by mixing and stirring these components.

The method for forming the third hard coat using the coating material for third hard coat formation is not particularly limited, and a known web coating method can be used. Examples of the method include roll coating, gravure coating, reverse coating, roll brushing, dip coating, spray coating, spin coating, air knife coating, and die coating.

The thickness of the third hard coat may be preferably 10 µm or more and more preferably 15 µm or more from a viewpoint of the surface hardness of the hard coat laminated film. On the other hand, the thickness of the third hard coat may be preferably 30 µm or less, more preferably 27 µm or less, and still more preferably 25 µm or less from viewpoints of the curl resistance and bending resistance of the hard coat laminated film. In an embodiment, the thickness of the third hard coat may be preferably 10 µm or more and 30 µm or less, 10 µm or more and 27 µm or less, 10 µm or more and 25 µm or less, 15 µm or more and 30 µm or less, 15 µm or more and 27 µm or less, or 15 µm or more and 25 µm or less.

Incidentally, in an embodiment where the third hard coat is formed, an aspect in which the same coating material as the coating material for third hard coat formation is used as the coating material for second hard coat formation is also preferable. In addition, in an embodiment where the third hard coat is formed, it goes without saying that the coating material for second hard coat formation and the thickness are required to be set in consideration of the sum of the curling force by the first hard coat and the curling force by the third hard coat.

Transparent Resin Film

The transparent resin film is a layer to be a transparent film substrate for forming thereon the first hard coat; the first hard coat and the third hard coat; the first hard coat and the second hard coat; or the first hard coat, the second hard coat, and the third hard coat.

The transparent resin film is not limited except that it exhibits high transparency and is preferably not limited except that it exhibits high transparency and is not colored, and any transparent resin film can be used. Examples of the transparent resin film include films of cellulose ester-based resins such as triacetyl cellulose; polyester-based resins such as polyethylene terephthalate; cyclic hydrocarbon-based resins such as ethylene norbornene copolymer; acrylic resins such as polymethyl methacrylate, polyethyl methacrylate, and vinylcyclohexane/methyl (meth)acrylate copolymer; aromatic polycarbonate-based resins; polyolefin-based resins such as polypropylene and 4-methyl-pentene-1; polyamide-based resins; polyarylate-based resins; polymer type urethane acrylate-based resins; polyimide-based resins and the like. These films include non-oriented films, uniaxially oriented films, and biaxially oriented films. In addition, the transparent resin film includes laminated films in which one kind or two or more kinds of these films are laminated by two or more layers.

The thickness of the transparent resin film is not particularly limited, and the transparent resin film may be controlled to have any thickness, if desired. The thickness of the transparent resin film may be usually 20 μm or more and preferably 50 μm or more from a viewpoint of the handleability of the hard coat laminated film of the various embodiments. In a case where the hard coat laminated film of the various embodiments is used as a display face plate of a touch panel, the thickness of the transparent resin film may be usually 100 μm or more, preferably 200 μm or more, and more preferably 300 μm or more from a viewpoint of maintaining the stiffness. In addition, the thickness of the transparent resin film may be usually 1500 μm or less, preferably 1200 μm or less, and more preferably 1000 μm or less from a viewpoint of meeting the demand for thinning of the device. In a case where the hard coat laminated film of the various embodiments is used in applications which do not require high stiffness other than a display face plate of a touch panel, the thickness of the transparent resin film may be usually 250 μm or less and preferably 150 μm or less from a viewpoint of economical efficiency.

The transparent resin film is preferably a transparent resin film of an acrylic resin. Examples of the acrylic resin include (meth)acrylic acid ester (co)polymers, copolymers mainly comprised of structural units derived from (meth)acrylic acid esters (usually at 50% by mole or more, preferably 65% by mole or more, and more preferably 70% by mole or more), and modified products thereof. Incidentally, (meth) acryl means acryl or methacryl. In addition, a (co)polymer means a polymer or a copolymer.

Examples of the (meth)acrylic acid ester (co) polymers include methyl poly(meth)acrylate, ethyl poly(meth)acrylate, propyl poly(meth)acrylate, butyl poly(meth)acrylate, methyl (meth)acrylate/butyl (meth)acrylate copolymer, and ethyl (meth)acrylate/butyl (meth)acrylate copolymer.

Examples of the copolymers mainly comprised of structural units derived from (meth)acrylic acid esters include ethylene/methyl (meth)acrylate copolymer, styrene/methyl (meth)acrylate copolymer, vinylcyclohexane/methyl (meth) acrylate copolymer, maleic anhydride/methyl (meth)acrylate copolymer, and N-substituted maleimide/methyl (meth) acrylate copolymer.

Examples of the modified product include a polymer into which a lactone ring structure is introduced by an intramolecular cyclization reaction; a polymer into which glutaric anhydride is introduced by an intramolecular cyclization reaction; and a polymer into which an imide structure is introduced by a reaction with an imidizing agent such as methylamine, cyclohexylamine, and ammonia (hereinafter referred to as a poly(meth)acrylimide-based resin).

Examples of the transparent resin film of an acrylic resin include films of resin mixtures of one or two or more kinds of these. In addition, the transparent resin film of an acrylic resin include laminated films in which one kind or two or more kinds of these films are laminated by two or more layers.

The transparent resin film is more preferably a film of vinylcyclohexane/methyl (meth)acrylate copolymer. The use of such a transparent resin film enables the production of a hard coat laminated film excellent in surface hardness, abrasion resistance, transparency, surface smoothness, appearance, stiffness, and moisture resistance, which can be suitably used as a display face plate of a touch panel. The content of the structural units derived from methyl (meth) acrylate in the vinyl cyclohexane/methyl (meth)acrylate copolymer may be usually 50 to 95% by mole, preferably 65 to 90% by mole, and more preferably 70 to 85% by mole with respect to 100% by mole of the sum of structural units derived from all the polymerizable monomers. Here, the term "polymerizable monomer" means methyl (meth)acrylate, vinylcyclohexane, and monomers copolymerizable with these. The copolymerizable monomer is usually a compound having a carbon-carbon double bond and is typically a compound having an ethylenic double bond.

The transparent resin film is more preferably a film of a poly(meth)acrylimide resin. The use of such a transparent resin film enables the production of a hard coat laminated film excellent in surface hardness, abrasion resistance, transparency, surface smoothness, appearance, stiffness, heat resistance, and dimensional stability against heat, which can be suitably used as a display face plate of a touch panel or a transparent conductive substrate.

The yellowness index (measured using a colorimeter "SolidSpec-3700" (trade name) available from Shimadzu Corporation in conformity with HS K7105: 1981) of the acrylic resin constituting the transparent resin film is preferably 3 or less, more preferably 2 or less, and still more preferably 1 or less. A hard coat laminated film to be suitably used as a member of an image display device can be obtained by use of an acrylic resin having a yellowness index of 3 or less. A lower yellowness index is more preferable.

The melt mass flow rate (measured under conditions of 260° C. and 98.07 N in conformity with ISO 1133) of the acrylic resin constituting the transparent resin film is preferably 0.1 to 20 g/10 minutes and more preferably 0.5 to 10 g/10 minutes from viewpoints of extrusion load and stability of the molten film.

In addition, the acrylic resin can further contain, if desired, additives such as a thermoplastic resin other than an acrylic resin; a pigment, an inorganic filler, an organic filler, a resin filler; a lubricant, an antioxidant, a weather resistant stabilizer, a heat stabilizer, a mold release agent, an antistatic agent, and a surfactant as long as the object of the various embodiments is not impaired. The amount of the optional component(s) blended is usually about 0.01 to 10 parts by mass with respect to 100 parts by mass of the acrylic resin.

The transparent resin film is preferably a transparent multilayer film in which a first acrylic resin layer ($\alpha 1$); an aromatic polycarbonate-based resin layer ($\beta$); and a second acrylic resin layer ($\alpha 2$) are directly laminated in this order. Incidentally, in the present specification, the various embodiments will be described on the assumption that the touch surface is formed on the $\alpha 1$ layer side.

An acrylic resin is excellent in surface hardness but is likely to be insufficient in cutting processability while an aromatic polycarbonate-based resin is excellent in cutting processability but is likely to be insufficient in surface hardness. For this reason, by the use of a transparent multilayer film having the above layer configuration, the weak points of both of these are compensated and a hard coat laminated film excellent in both of the surface hardness and cutting processability can be easily obtained.

The layer thickness of the $\alpha 1$ layer is not particularly limited. The layer thickness may be usually 20 μm or more, preferably 40 μm or more, more preferably 60 μm or more, and still more preferably 80 μm or more from a viewpoint of the surface hardness of the hard coat laminated film of the various embodiments.

The layer thickness of the $\alpha 2$ layer is not particularly limited. It is preferable that the layer thickness is the same as the layer thickness of the $\alpha 1$ layer from a viewpoint of curl resistance of the hard coat laminated film of the various embodiments.

Incidentally, here, "the same layer thickness" should not be interpreted as the exactly same thickness in the physicochemically strict meaning. It should be interpreted as the same layer thickness within the range of fluctuation of process and quality control usually performed industrially. If the layer thicknesses are the same within the range of fluctuation of process and quality control usually performed industrially, the curl resistance of the multilayer film can be favorably maintained. The layer thickness can be controlled to fall within a fluctuation range of about −0.5 to +0.5 μm in process and quality control, and thus a layer thickness of 65 μm and a layer thickness of 75 μm should be interpreted as the same in the case of a non-oriented multilayer film by T die coextrusion method. "The same layer thickness" herein can be rephrased as "substantially the same layer thickness".

The layer thickness of the 13 layer is not particularly limited. The layer thickness may be usually 20 μm or more and preferably 80 μm or more from a viewpoint of cutting processability of the hard coat laminated film of the various embodiments.

For the acrylic resin in the α1 layer and the α2 layer, those described above can be used.

Incidentally, as the acrylic resin to be used in the α1 layer and the acrylic resin to be used in the α2 layer, those having different resin properties, for example, different kinds of acrylic resins, acrylic resins having different melt mass flow rates, glass transition temperatures and the like may be used. It is preferable to use those having the same resin properties from a viewpoint of the curl resistance of the hard coat laminated film of the various embodiments. For example, it is one of the preferred embodiments to use those of the same lot in the same grade.

As the aromatic polycarbonate-based resin to be used in the 13 layer, it is possible to use one kind or a mixture of two or more kinds of aromatic polycarbonate-based resins, for example, a polymer obtained from an aromatic dihydroxy compound such as bisphenol A, dimethyl bisphenol A, or 1,1-bis(4-hydroxyphenyl)-3,3,5-trimethylcyclohexane and phosgene by the interfacial polymerization method; a polymer obtained by the transesterification reaction of an aromatic dihydroxy compound such as bisphenol A, dimethyl bisphenol A, or 1,1-bis(4-hydroxyphenyl)-3,3,5-trimethylcyclohexane and a diester of carbonic acid such as diphenyl carbonate.

Examples of a preferred optional component which can be contained in the aromatic polycarbonate-based resin include core-shell rubber. It is possible to further enhance the cutting processability and impact resistance of the hard coat laminated film by use of the core-shell rubber in an amount of 0 to 30 parts by mass (100 to 70 parts by mass of the aromatic polycarbonate-based resin) and preferably 0 to 10 parts by mass (100 to 90 parts by mass of the aromatic polycarbonate-based resin) with respect to 100 parts by mass of the sum of the aromatic polycarbonate-based resin and the core-shell rubber.

Examples of the core-shell rubber include core-shell rubbers such as methacrylic acid ester-styrene/butadiene rubber graft copolymer, acrylonitrile-styrene/butadiene rubber graft copolymer, acrylonitrile-styrene/ethylene-propylene rubber graft copolymer, acrylonitrile-styrene/acrylic acid ester graft copolymer, methacrylic acid ester/acrylic acid ester rubber graft copolymer, methacrylic acid ester-styrene/acrylic acid ester rubber graft copolymer, and methacrylic acid ester-acrylonitrile/acrylic acid ester graft copolymer. As the core-shell rubber, one kind of these or a mixture of two or more kinds thereof can be used.

Further, the aromatic polycarbonate-based resin can further contain, if desired, additives such as a thermoplastic resin other than the aromatic polycarbonate-based resin and the core-shell rubber; a pigment, an inorganic filler, an organic filler, a resin filler; a lubricant, an antioxidant, a weather resistant stabilizer, a heat stabilizer, a mold release agent, an antistatic agent, and a surfactant as long as the object of the various embodiments is not impaired. The amount of the optional component(s) blended is about 0.01 to 10 parts by mass with respect to 100 parts by mass of the sum of the aromatic polycarbonate-based resin and the core-shell rubber.

The method for producing the transparent resin film is not particularly limited. Examples of a preferred production method in a case in which the transparent resin film is a transparent multilayer film in which a first poly(meth)acrylimide-based resin layer (α1); an aromatic polycarbonate-based resin layer (β); and a second poly(meth)acrylimide-based resin layer (α2) are directly laminated in this order include the method described in JP-A-2015-083370. In addition, when the first hard coat and the second hard coat are formed, the surface on which a hard coat is to be formed or both surfaces of the transparent resin film may be subjected in advance to an easy adhesion treatment such as a corona discharge treatment or anchor coat formation in order to enhance the adhesive strength with the hard coat.

Figure 2:
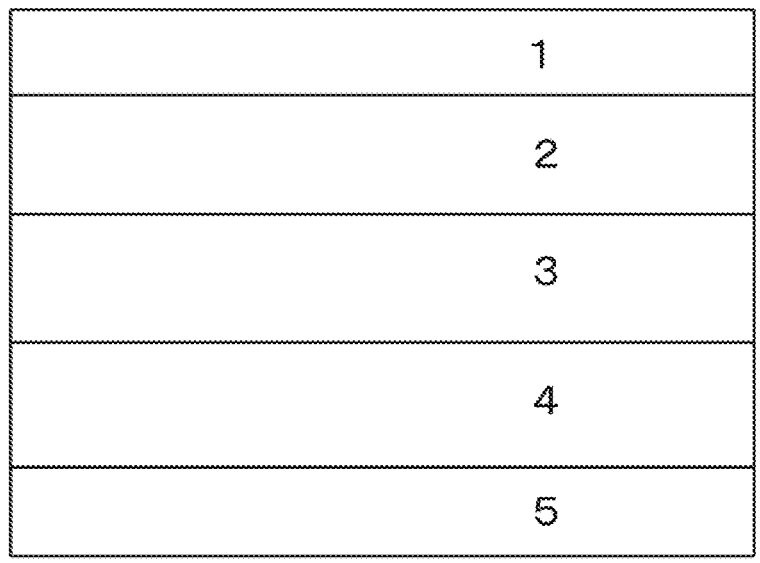
FIG. 2 is a cross-sectional view illustrating an example of the hard coat laminated film according to an embodiment.

FIG. 2 is a conceptual view of a cross section illustrating an example of the hard coat laminated film of the various embodiments. The hard coat laminated film sequentially has a first hard coat 1, a first poly(meth)acrylimide-based resin layer (α1) 2, an aromatic polycarbonate-based resin layer (β) 3, a second poly(meth)acrylimide-based resin layer (α2) 4, and a second hard coat 5 from the touch surface side.

The hard coat laminated film of the various embodiments may have an optional layer other than the first hard coat, the second hard coat, the third hard coat, and the transparent resin film layer, if desired. Examples of the optional layer include a fourth hard coat, an anchor coat layer, a pressure-sensitive adhesive layer, a transparent conductive layer, a high refractive index layer, a low refractive index layer, and an antireflection functioning layer.

The components and thickness of the fourth hard coat are not particularly limited but may be, for example, those described above for the second hard coat or third hard coat.

It is preferable that the hard coat laminated film of the various embodiments (for any configuration of first hard coat/transparent resin film layer, first hard coat/transparent resin film layer/second hard coat, first hard coat/third hard coat/transparent resin film layer, or first hard coat/third hard coat/transparent resin film layer/second hard coat) is one in which no scratches are found when the hard coat laminated film is placed on a Gakushin-type tester in accordance with HS L0849:2013 so that the first hard coat is on the surface side; a steel wool of #0000 is subsequently attached to a rubbing finger of the Gakushin-type tester and a load of 500 g is then applied; and, after 9000 reciprocating rubbings of the surface of the first hard coat under conditions that the moving speed of the rubbing finger is 300 mm/min and the moving distance is 30 mm, the rubbed portion is visually observed. The hard coat laminated film is more preferably one in which no scratches are found after 10000 reciprocating rubbings of the surface of the first hard coat. The hard coat laminated film is still more preferably one in which no scratches are found after 11000 reciprocating rubbings of the surface of the first hard coat. The hard coat laminated film is yet more preferably one in which no scratches are found after 12000 reciprocating rubbings of the surface of the first hard coat. The hard coat laminated film is most preferably one in which no scratches are found after 13000 reciprocating rubbings of the surface of the first hard coat. The hard coat laminated film is preferably one in which no scratches are found after a still larger number of reciprocating rubbings of the surface of the first hard coat. Because it exhibits such good abrasion resistance (steel wool resistance), the hard coat laminated film of the various embodiments can be suitably used as a member of an image display device.

The total light transmittance (measured using a turbidity meter "NDH 2000" (trade name) available from Nippon Denshoku Industries Co., Ltd. in conformity with JIS K7361-1: 1997) of the hard coat laminated film of the various embodiments (for any configuration of first hard coat/transparent resin film layer, first hard coat/transparent resin film layer/second hard coat, first hard coat/third hard coat/transparent resin film layer, or first hard coat/third hard coat/transparent resin film layer/second hard coat) is preferably 85% or more, more preferably 88% or more, and still more preferably 90% or more. When the total light transmittance thereof is 85% or more, the hard coat laminated film of the various embodiments can be suitably used as a member of an image display device. A higher total light transmittance is more preferable.

The minimum bending radius of the hard coat laminated film of the various embodiments (for any configuration of first hard coat/transparent resin film layer, first hard coat/transparent resin film layer/second hard coat, first hard coat/third hard coat/transparent resin film layer, or first hard coat/third hard coat/transparent resin film layer/second hard coat) is preferably 70 mm or less, more preferably 60 mm or less, still more preferably 50 mm or less, yet more preferably 40 mm or less, and most preferably 30 mm or less. When the minimum bending radius thereof is preferably 70 mm or less, the hard coat laminated film of the various embodiments can be easily handled as a film roll and is advantageous in terms of production efficiency and the like. A smaller minimum bending radius is more preferable. Here, the minimum bending radius is a value measured according to the test (v) in Examples described later. Incidentally, the minimum bending radius is a bending radius immediately before a crack is generated on the surface of the bent portion when the hard coat laminated film is bent and is an index indicating the limit of bending. The bending radius is defined in the same manner as the radius of curvature.

Figure 3:
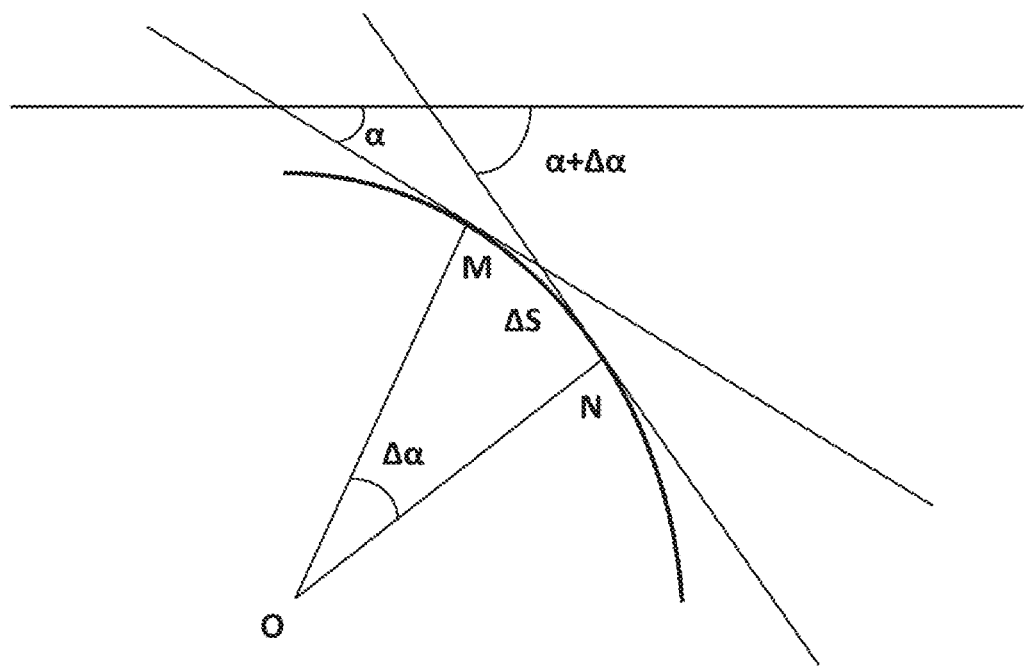
FIG. 3 is a diagram for explaining a radius of curvature.

A radius of curvature is defined as follows. The length from the point M to the point N in the curve is denoted as $\Delta S$; the difference between the slope of the tangent line at the point M and the slope of the tangent line at the point N as $\Delta \alpha$; and the intersection of the line which is perpendicular to the tangent line at the point M and intersects with the tangent line at the point M and the line which is perpendicular to the tangent line at the point N and intersects with the tangent line at the point N, as O. In the case where $\Delta S$ is sufficiently small, the curve from the point M to the point N can be approximated to an arc (see FIG. 3). The radius in this case is defined as the radius of curvature. Further, the radius of curvature is denoted as R. Then, $\angle MON = \Delta\alpha$. In the case where $\Delta S$ is sufficiently small, $\Delta\alpha$ is also sufficiently small and therefore $\Delta S = R\Delta\alpha$. As the result, $R = \Delta S/\Delta\alpha$.

In the hard coat laminated film (for any configuration of first hard coat/transparent resin film layer, first hard coat/transparent resin film layer/second hard coat, first hard coat/third hard coat/transparent resin film layer, or first hard coat/third hard coat/transparent resin film layer/second hard coat) of the various embodiments, the water contact angle on the first hard coat surface is preferably 95 degrees or more, more preferably 100 degrees or more, and still more preferably 105 degrees or more. The first hard coat forms a touch surface in a case where the hard coat laminated film of the various embodiments is used as a display face plate of a touch panel. As the water contact angle on the first hard coat surface is 95 degrees or more, it is possible to slide a finger or a pen on the touch surface as desired and thus to operate the touch panel. It is more preferable as the water contact angle is higher from a viewpoint of sliding a finger or a pen as desired. The upper limit of the water contact angle is not particularly limited, but usually about 120 degrees is enough. Here, the water contact angle is a value measured in conformity with the test (vi) in Examples described later.

In the hard coat laminated film (for any configuration of first hard coat/transparent resin film layer, first hard coat/transparent resin film layer/second hard coat, first hard coat/third hard coat/transparent resin film layer, or first hard coat/third hard coat/transparent resin film layer/second hard coat) of the various embodiments, the water contact angle on the first hard coat surface after being wiped with cotton (after being wiped with gauze), preferably after being wiped with cotton back and forth 15,000 times (i.e., after 15,000 reciprocating rubbings with cotton), more preferably after being wiped with cotton back and forth 20,000 times, and still more preferably after being wiped with cotton back and forth 25,000 times is preferably 95 degrees or more, more preferably 100 degrees or more, and still more preferably 105 degrees or more. As the water contact angle on the first hard coat surface after being wiped with cotton back and forth 15,000 times is 95 degrees or more, the surface properties such as finger slidability can be maintained even if the surface is repeatedly wiped with a handkerchief and the like. It is more preferable as the number of times of wiping with cotton in which the water contact angle of 95 degrees or more can be kept is larger. Here, the water contact angle after being wiped with cotton is a value measured in conformity with the test (vii) in Examples described later.

The yellowness index (measured using a colorimeter "SolidSpec-3700" (trade name) available from Shimadzu Corporation in conformity with JIS K7105: 1981) of the hard coat laminated film of the various embodiments is preferably 3 or less, more preferably 2 or less, and still more preferably 1 or less (for any configuration of first hard coat/transparent resin film layer, first hard coat/transparent resin film layer/second hard coat, first hard coat/third hard coat/transparent resin film layer, or first hard coat/third hard coat/transparent resin film layer/second hard coat). A lower yellowness index is more preferable. The hard coat laminated film of the various embodiments can be suitably used as a member of an image display device as the yellowness index thereof is 3 or less.

The hard coat laminated film of the various embodiments can be suitably used as an article or a member of an article since it has the preferred properties as described above. Examples of the article or the member of an article include image display devices such as liquid crystal displays, plasma displays, and electroluminescent displays and members such as display face plates, transparent conductive substrates, and housings thereof; televisions, personal computers, tablet information devices, smart phones, and members such as housings and display face plates thereof; furthermore, refrigerators, washing machines, cupboards, clothes racks, and panels constituting these; windows and doors of buildings; vehicles, windows of vehicles, windshields, roof windows, instrument panels and the like; electronic signboards and protection plates thereof, show windows; and solar cells and members such as housings and front plates thereof.

EXAMPLES

Hereinafter, the various embodiments will be described with reference to Examples, but the various embodiments is not limited thereto.

Measuring Methods (i) Abrasion Resistance 1 (Resistance Against Steel Wool)

A hard coat laminated film was placed on a Gakushin-type tester (friction tester type 2) in accordance with JIS L0849:2013 so that the first hard coat was on the surface side. A steel wool of #0000 was subsequently attached to a rubbing finger of the Gakushin-type tester and a load of 500 g was then applied. After 9000 reciprocating rubbings of the surface of the test piece (surface of the first hard coat) under conditions that the moving speed of the rubbing finger was 300 mm/min and the moving distance was 30 mm, the rubbed portion was visually observed. In the case where no scratch was found, the operation of additionally carrying out 1000 reciprocating rubbings and then visually observing the rubbed portion was repeated, and the evaluation was performed according to the following criteria. According to the criteria, it is acceptable from a practical perspective when the evaluated result is E or better, namely, A to E, and it can be highly favorable when the evaluated result is C or better.

A: No scratches were found even after 13000 cycles of reciprocation.

B: No scratches were found after 12000 cycles of reciprocation but scratches were found after 13000 cycles of reciprocation.

C: No scratches were found after 11000 cycles of reciprocation but scratches were found after 12000 cycles of reciprocation.

D: No scratches were found after 10000 cycles of reciprocation but scratches were found after 11000 cycles of reciprocation.

E: No scratches were found after 9000 cycles of reciprocation but scratches were found after 10000 cycles of reciprocation.

F: Scratches were found after 9000 cycles of reciprocation.

(ii) Total Light Transmittance

The total light transmittance was measured according to JIS K7361-1:1997 by using a turbidimeter "NDH2000" (trade name) available from Nippon Denshoku Industries Co., Ltd.

(iii) Haze

The haze was measured according to JIS K7136:2000 by using a turbidimeter "NDH2000" (trade name) available from Nippon Denshoku Industries Co., Ltd.

(iv) Yellowness Index

The yellowness index was measured according to JIS K7105:1981 by using a colorimeter "SolidSpec-3700" (trade name) available from Shimadzu Corporation.

(v) Minimum Bending Radius

With reference to Bending Formability (B method) in JIS-K6902:2007, a test piece of a hard coat laminated film was conditioned at a temperature of 23° C.±2° C. and a relative humidity of 50±5% for 24 hours, and thereafter the test piece was bent to form a curve at a bending temperature of 23° C.±2° C. at a bending line with a direction perpendicular to the machine direction of the hard coat laminated film so that the first hard coat of the hard coat laminated film was on the outer side, and for the resultant, measurement was performed. The radius of the front face of the shaping jig having the smallest radius of the front face among shaping jigs with no crack generated was defined as the minimum bending radius. The "front face" has the same meaning as the term regarding a shaping jig in the B method defined in Paragraph 18.2 in JIS K6902:2007.

(vi) Water Contact Angle

The water contact angle of a hard coat laminated film was measured for the surface of the first hard coat with an automatic contact angle meter "DSA 20" (trade name) available from KRUSS GmbH by using a method to calculate from the width and the height of a water drop (as indicated in JIS R3257:1999).

(vii) Abrasion Resistance 2 (Water Contact Angle after Wipes with Cotton)

A test piece of a hard coat laminated film was prepared in a size of 150 mm length and 50 mm width so that the machine direction of the hard coat laminated film corresponded to the longitudinal direction of the test piece, and the test piece was placed on a Gakushin-type tester in accordance with JIS L0849:2013 so that the first hard coat of the hard coat laminated film was on the surface side. A stainless steel sheet (10 mm length, 10 mm width, 1 mm thickness) covered with a four-ply gauze (a type 1 medical gauze available from Kawamoto Corporation) was attached to a rubbing finger of the Gakushin-type tester, and the resultant was set so that the sheet face of the stainless steel sheet came into contact with the test piece and a load of 350 g was applied. After 10000 reciprocating rubbings of the surface of the first hard coat of the test piece under conditions that the moving distance of the rubbing finger was 60 mm and the speed was 1 cycle/sec, the water contact angle on the cotton-wiped portion was measured in accordance with the method in the (vi). In the case where the water contact angle was 95° or more, the operation of additionally carrying out 5000 reciprocating rubbings and then measuring the water contact angle on the cotton-wiped portion in accordance with the method in the (vi) was repeated, and evaluation was performed by using the following criteria.

A: The water contact angle was 95° or more even after 25000 cycles of reciprocation.

B: The water contact angle was 95° or more after 20000 cycles of reciprocation but the water contact angle was less than 95° after 25000 cycles of reciprocation.

C: The water contact angle was 95° or more after 15000 cycles of reciprocation but the water contact angle was less than 95° after 20000 cycles of reciprocation.

D: The water contact angle was 95° or more after 10000 cycles of reciprocation but the water contact angle was less than 95° after 15000 cycles of reciprocation.

E: The water contact angle was less than 95° after 10000 cycles of reciprocation.

(viii) Surface smoothness (surface appearance)

The surface (i.e., each of both surfaces) of a hard coat laminated film was visually observed while irradiating with a fluorescent light from various incident angles, and evaluation was performed by using the following criteria.

⊚ (very good): No undulations or flaws were found on the surface. No cloudiness was perceived even when the surface was seen through with a light irradiated closely.

○ (good): A portion with a little cloudiness was found when the surface was seen through with a light irradiated closely.

Δ (slightly poor): Undulations or flaws were found on the surface in a small quantity when the surface was looked at closely. Further, cloudiness was perceived.

x (poor): Undulations or flaws were found on the surface in a large quantity. Further, cloudiness was clearly perceived.

(ix) Cross-Cut Test (Adhesiveness)

In accordance with JIS K5600-5-6:1999, a square lattice pattern cut consisting of 100 cells (1 cell=1 mm×1 mm) was provided on a hard coat laminated film from the first hard coat surface side. Thereafter, a tape for adhesion tests was attached on the square lattice pattern cut and rubbed with fingers and then peeled off. The criteria for evaluation were in accordance with Table 1 in the above standard of JIS.

Classification 0: The edges of the cuts were completely smooth; none of the squares of the lattice was detached.

Classification 1: Detachment of small flakes of the coating was seen at the intersections of the cuts. A cross-cut area of not greater than 5% apparently was affected.

Classification 2: The coating flaked along the edges and/or at the intersections of the cuts. A cross-cut area of greater than 5% apparently, but not greater than 15%, was affected.

Classification 3: The coating flaked along the edges of the cuts partly or wholly in large ribbons, and/or it flaked partly or wholly on different parts of the squares. A cross-cut area of greater than 15% apparently, but not greater than 35%, was affected.

Classification 4: The coating flaked along the edges of the cuts partly or wholly in large ribbons and/or some squares detached partly or wholly. A cross-cut area of greater than 35% apparently, but not greater than 65%, was affected.

Classification 5: This criterion was defined as the case where the degree of flaking was greater than that in Classification 4.

(x) Cutting Processability (Condition of Curved Cutting-Processed Line)

A hard coat laminated film was provided with a cut hole in true circle with a diameter of 2 mm and a cut hole in true circle with a diameter of 0.5 mm by using a router processing machine automatically controlled with a computer. The mill used then was a four-bladed super-hard-alloy mill with nicks that has a cylindrically round tip, and the blade diameter was appropriately selected depending on a portion to be processed. Subsequently, the cut hole with a diameter of 2 mm was observed for the cut edge surface visually or with a microscope (100×) and evaluation was performed by using the following criteria. Similarly, the cut hole with a diameter of 0.5 mm was observed for the cut edge surface visually or with a microscope (100×) and evaluation was performed by using the following criteria. The result of the former case and the result of the latter case were listed in this order in the tables below.

⊚ (very good): No crack or burr was found even in microscopic observation.

○ (good): No crack was found even in microscopic observation. However, a burr was found.

Δ (slightly poor) No crack was visually found. However, a crack was found in microscopic observation.

x (poor): A crack was found even in visual observation.

(xi) Pencil Hardness

The pencil hardness of the first hard coat surface of a hard coat laminated film was measured using a pencil "UNP" (trade name) available from Mitsubishi Pencil Co., Ltd. under conditions of a 25 mm test length and a 750 g load in conformity with JIS K 5600-5-4: 1999 except that the test speed was set to 2 mm/sec and the run number was set to 5 times. The presence or absence of a scar generated was judged by visually observing the sample surface under a fluorescent light and at a position 50 cm away from the fluorescent light.

(xii) Handling Property

A hard coat laminated film roll having a winding length of 300 m was rewound at a line speed of 20 m/min. The winding appearance and the first hard coat surface of the hard coat laminated film were then visually observed, and the evaluation was performed according to the following criteria.

⊚ (very good): Cracks were not seen. Winding appearance was also favorable.

○ (good): Cracks were not seen. However, slack of winding occurred and winding appearance was insufficient.

Δ (slightly poor): Cracks were generated at 1 to 10 places in winding length of 300 m.

x (poor): Cracks were generated at 11 or more places in winding length of 300 m.

Raw Materials Used (A) Copolymer of (a1) polyfunctional (meth)acrylate and (a2) polyfunctional thiol (A-1) "STAR-501" (trade name) available from Osaka Organic Chemical Industry Ltd., a copolymer having a so-called dendrimer structure of dipentaerythritol hexaacrylate and a tetrafunctional thiol. Sulfur content: 2.2% by mass. Mass average molecular weight: 12,000, number average molecular weight: 940, and Z average molecular weight: 73,000.

(A') Reference materials (A'-1) Dipentaerythritol hexaacrylate (hexafunctional).

(A'-2) A compound having four secondary thiol groups in one molecule "Karenz MT PE-1" (trade name) available from Showa Denko K.K. Pentaerythritol tetrakis(3-mercaptobutyrate).

(B) Water repellent agent (B-1) An acryloyl group-containing fluoropolyether-based water repellent agent "KY-1203" (trade name) available from Shin-Etsu Chemical Co., Ltd. Solid content: 20% by mass.

(B-2) A methacryloyl group-containing fluoropolyether-based water repellent agent "FOMBLIN MT70" (trade name) available from Solvay S.A. Solid content: 70% by mass.

(B-3) A fluoropolyether-based water repellent agent (not having (meth)acryloyl group).

(B-4) An acrylic-ethylene copolymer wax-based water repellent agent.

(B-5) An acryloyl group-containing fluoroalkyl-based water repellent agent (2-(perfluorobutyl)ethyl acrylate) "CHEMINOX FAAC-4" (trade name) available from Unimatec Co., Ltd. Solid content: 100% by mass.

(C) Leveling Agent (C-1) An acrylic polymer-based leveling agent "BYK-399" (trade name) available from BYK Japan KK. Solid content: 100% by mass.

(C-2) A silicone-acrylic copolymer-based leveling agent "DISPARLON NSH-8430HF" (trade name) available from Kusumoto Chemicals, Ltd. Solid content: 10% by mass.

(D) Inorganic particles (D-1) Silica particles having an average particle diameter of 20 nm which has been subjected to a surface treatment with a silane coupling agent having a vinyl group.

(E) Optional components (E-1) An acetophenone-based photopolymerization initiator (1-hydroxy-cyclohexyl-phenyl ketone) "IRGACURE 184" (trade name) available from BASF SE.

(E-2) An acetophenone-based photopolymerization initiator (2-hydroxy-1-{4-[4-(2-hydroxy-2-methyl-propionyl)-benzyl]phenyl}-2-methyl-propane-1-one) "IRGACURE 127" (trade name) available from BASF SE.

(E-3) Methyl isobutyl ketone (E-4) 1-Methoxy-2-propanol (H1) Coating material for first hard coat formation (H1-1) A coating material was obtained by mixing and stirring 100 parts by mass of the (A-1), 1.25 parts by mass of the (B-1) (0.25 parts by mass in terms of solids), 0.06 parts by mass of the (B-2) (0.042 parts by mass in terms of solids), 2 parts by mass of the (E-1), 1 part by mass of the (E-2), 40 parts by mass of the (E-3), and 100 parts by mass of the (E-4). The composition of this coating material is presented in Table 1. Incidentally, the values listed in the tables are all in terms of solids except the solvents ((E-3) and (E-4)). In addition, the "first HC coating material" in the table means the coating material for first hard coat formation. The same applies hereinafter.

(H1-2 to H1-13) Coating materials were obtained in the same manner as (H1-1) except that the compositions of the coating materials were changed as presented in one of Tables 1 to 4.

(H2) Coating material for second hard coat formation (H2-1) A coating material was obtained by mixing and stirring 100 parts by mass of the (A-1), 0.5 parts by mass of the (C-1), 2 parts by mass of the (E-1), 1 part by mass of the (E-2), 40 parts by mass of the (E-3), and 100 parts by mass of the (E-4). The composition of this coating material is presented in the respective tables. Incidentally, the values listed in the tables are all in terms of solids except the solvents ((E-3) and (E-4)). The "second HC coating material" in the tables means the coating material for second hard coat formation. The same applies hereinafter.

(H2-2 to H2-6) Coating materials were obtained in the same manner as (H2-1) except that the compositions of the coating materials were changed as presented in one of Tables 1 to 4.

(H3) Coating material for third hard coat formation (H3-1) A coating material was obtained by mixing and stirring 100 parts by mass of the (A-1), 140 parts by mass of the (D-1), 2 parts by mass of the (C-2) (0.2 parts by mass in terms of solids), 2 parts by mass of the (E-1), 1 part by mass of the (E-2), 80 parts by mass of the (E-3), and 200 parts by mass of the (E-4).

Figure 4:
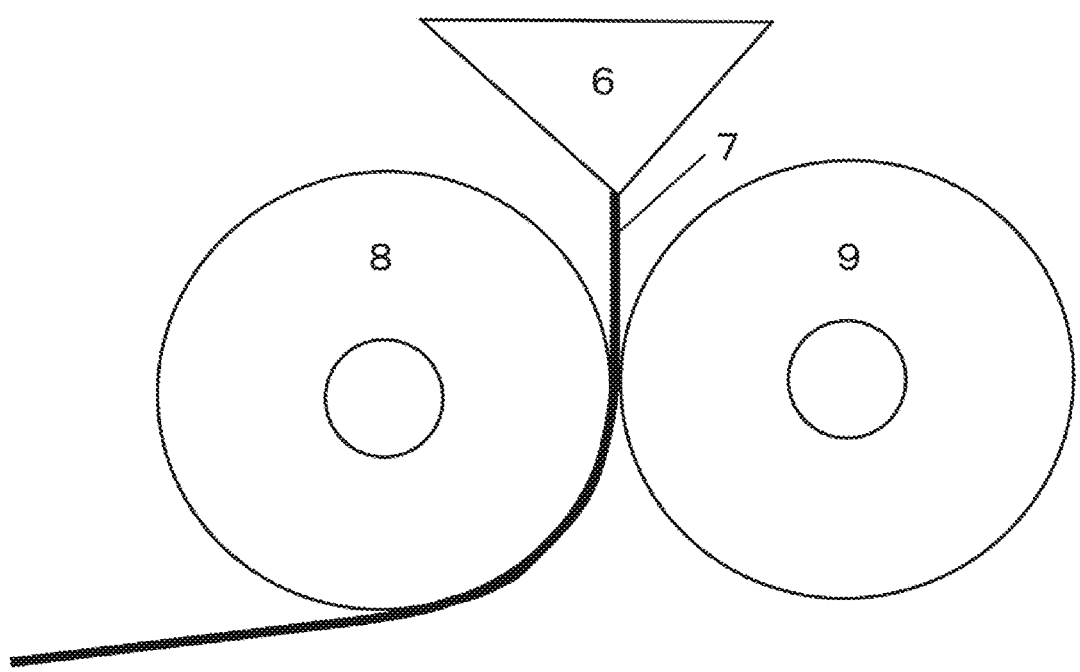
FIG. 4 is a conceptual view of a film forming apparatus used in Examples.

(P) Transparent resin film (P-1) Using an apparatus equipped with a two-component/three-layer multimanifold-type coextrusion T-die 6 and a winder having a mechanism to pressurize a melted film 7 with a first mirror-finished roll 8 (i.e. a roll to hold a melted film and send the melted film to a subsequent transfer roll) and a second mirror-finished roll 9 (see FIG. 4), a two-component/three-layer multilayer resin film in which both outer layers (α1 layer and α2 layer) were formed of a poly(meth)acrylimide "PLEXIMID TT50" (trade name) available from Evonik Industry AG and an intermediate layer (II layer) was formed of an aromatic polycarbonate "CALIBRE 301-4" (trade name) available from Sumika Styron Polycarbonate Limited was continuously coextruded from the coextrusion T-die 6, and the coextruded product was fed between the rotating first mirror-finished roll and the rotating second mirror-finished roll so that the α1 layer was on the first mirror-finished roll side, and pressurized. As a result, a transparent resin film having a total thickness of 250 µm was obtained in which the layer thickness of the α1 layer was 80 µm, the layer thickness of the 13 layer was 90 µm and the layer thickness of the α2 layer was 80 µm. Regarding the conditions set for this operation, the temperature of the T-die, the temperature of the first mirror-finished roll, the temperature of the second mirror-finished roll and the wind-up speed were set to 300° C., 130° C., 120° C. and 6.5 m/min, respectively.

(P-2) A transparent resin film was obtained in the same way as in the (P-1) except that an acrylic resin, containing a structural unit derived from methyl methacrylate in an amount of 76.8 mol % and a structural unit derived from vinylcyclohexane in an amount of 23.2 mol %, assuming that the sum of structural units derived from polymerizable monomers was 100 mol %, was used as both outer layers in place of the "PLEXIMID TT50" (trade name).

(P-3) A biaxially oriented polyethylene terephthalate film "DIAFOIL" (trade name) available from Mitsubishi Plastics, Inc.: thickness 250 µm.

(P-4) Using an apparatus equipped with a monolayer T-die and a winder having a mechanism to pressurize a melted film with a first mirror-finished roll (i.e. a roll to hold a melted film and send the melted film to a subsequent transfer roll) and a second mirror-finished roll, an aromatic polycarbonate "CALIBRE 301-4" (trade name) available from Sumika Styron Polycarbonate Limited was continuously extruded from the T-die, and the extruded product was fed between the rotating first mirror-finished roll and the rotating second mirror-finished roll, and pressurized, by which a transparent resin film having a total thickness of 250 µm was obtained. Regarding the conditions set for this operation, the temperature of the T-die, the temperature of the first mirror-finished roll, the temperature of the second mirror-finished roll and the wind-up speed were set to 320° C., 140° C., 120° C. and 5.6 m/min, respectively.

Example 1

Figure 5:
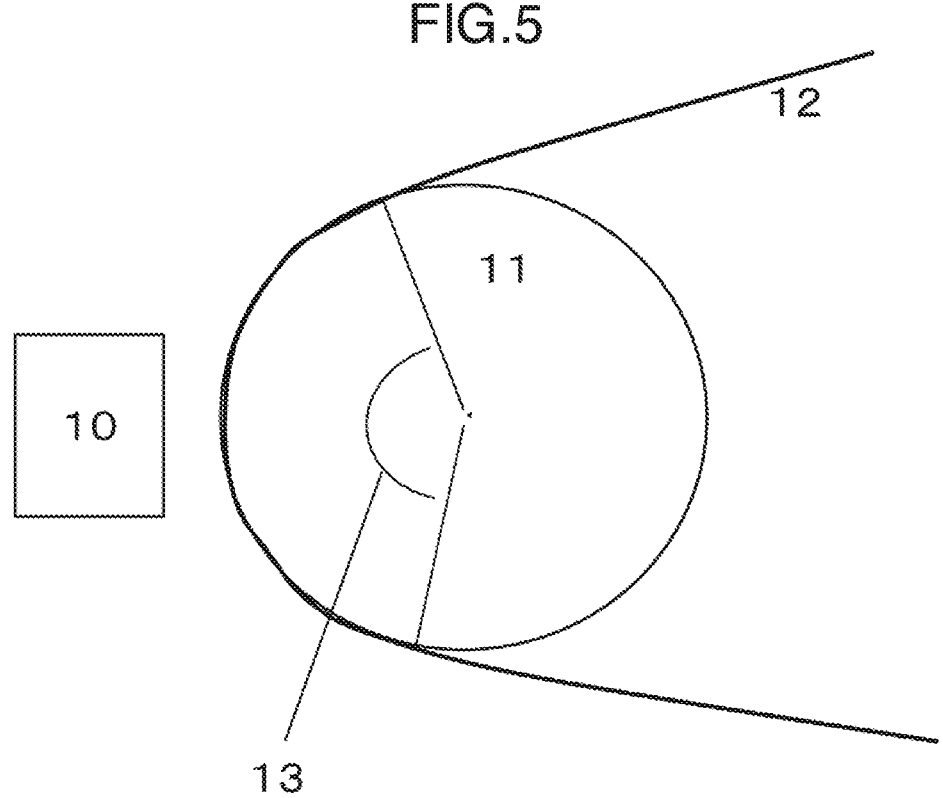
FIG. 5 is a conceptual view of an ultraviolet irradiation apparatus used in Examples.

Both surfaces of the (P-1) were subjected to a corona discharge treatment. Both surfaces had a wetting index of 64 mN/m. Subsequently, the surface on the α2 layer side was coated with the (H2-1) by using a die-type applicator so that the wet coat thickness was 42.4 µm (thickness after curing: 18 µm). Subsequently, the resultant was passed in a drying furnace with the inner temperature set to 80° C. at a line speed such that the time required to pass through from the inlet to the outlet was 1 minute, and then treated to form a second hard coat with a curing apparatus having a UV irradiator 10 of high-pressure mercury lamp type and a mirror-finished metal roll 11 having a diameter of 25.4 cm which were disposed opposite to each other (see FIG. 5), under conditions that the temperature of the mirror-finished metal roll 11 was 60° C. and the integrated amount of light was 500 mJ/cm². In FIG. 5, reference numeral 12 denotes a web, and reference numeral 13 denotes a holding angle. Subsequently, the surface on the α1 layer side was coated with the (H1-1) by using a die-type applicator so that the wet coat thickness was 42.5 µm (thickness after curing: 18 µm). Subsequently, the resultant was passed in a drying furnace with the inner temperature set to 80° C. at a line speed such that the time required to pass through from the inlet to the outlet was 1 minute, and then treated to form a first hard coat with a curing apparatus having a UV irradiator 10 of high-pressure mercury lamp type and a mirror-finished metal roll 11 having a diameter of 25.4 cm which were disposed opposite to each other (see FIG. 5), under conditions that the temperature of the mirror-finished metal roll 11 was 60° C. and the integrated amount of light was 500 mJ/cm², thus obtaining a hard coat laminated film. The above tests (i) to (xii) were carried out. The results are shown in Table 1. Incidentally, the "first HC thickness" in the tables means the thickness of the first hard coat after curing. The "second HC thickness" in the table means the thickness of the second hard coat after curing. The same applies to Tables 2 to 4.

Examples 2 and 3

The formation of hard coat laminated films and the measurement and evaluation of the respective physical properties thereof were performed in the same manner as in Example 1 except that the thicknesses of the first hard coat and second hard coat were changed to those listed in Table 1. The results are presented in Table 1.

Examples 4, 6 to 14, 13-2, and 13-3

The formation of hard coat laminated films and the measurement and evaluation of the respective physical properties thereof were performed in the same manner as in Example 1 except that the coating material for first hard coat formation and the coating material for second hard coat formation were changed to those listed in one of Tables 1 to 3. The results are presented in any one of Tables 1 to 3. Incidentally, the water contact angle was less than 95 degrees from the beginning and thus the test of the abrasion resistance 2 was omitted in Example 8.

Example 5

The formation of a hard coat laminated film and the measurement and evaluation of the respective physical properties thereof were performed in the same manner as in Example 1 except that the coating material for first hard coat formation and the coating material for second hard coat formation were changed to those listed in Table 1 and the thicknesses of the first hard coat and second hard coat were changed to those listed in Table 1. The results are presented in Table 1.

Examples 15 to 17

The formation of hard coat laminated films and the measurement and evaluation of the respective physical properties thereof were performed in the same manner as in Example 1 except that the transparent resin film to be used was changed to those listed in Table 3 or Table 4. The results are presented in Table 3 or Table 4.

Example 17-2

The formation of a hard coat laminated film and the measurement and evaluation of the respective physical properties thereof were performed in the same manner as in Example 1 except that the coating material for first hard coat formation, the coating material for second hard coat formation, and the transparent resin film were changed to those listed in Table 4. The results are presented in Table 4.

Example 18

Both surfaces of the (P-1) were subjected to a corona discharge treatment. Both surfaces had a wetting index of 64 mN/m. Subsequently, the surface on the α2 layer side was coated with the (H2-6) by using a die-type applicator so that the wet coat thickness was 53.8 μm (thickness after curing: 25 μm). Subsequently, the resultant was passed in a drying furnace with the inner temperature set to 80° C. at a line speed such that the time required to pass through from the inlet to the outlet was 1 minute, and then treated to form a second hard coat with a curing apparatus having a UV irradiator 10 of high-pressure mercury lamp type and a mirror-finished metal roll 11 having a diameter of 25.4 cm which were disposed opposite to each other (see FIG. 5), under conditions that the temperature of the mirror-finished metal roll 11 was 60° C. and the integrated amount of light was 500 mJ/cm$^2$. In FIG. 5, reference numeral 12 denotes a web, and reference numeral 13 denotes a holding angle. Subsequently, the surface on the α1 layer side was coated with the (H3-1) by using a die-type applicator so that the wet coat thickness was 32.3 μm (thickness after curing: 15 μm). Subsequently, the resultant was passed in a drying furnace with the inner temperature set to 90° C. at a line speed such that the time required to pass through from the inlet to the outlet was 1 minute, and then treated with a curing apparatus having a UV irradiator 10 of high-pressure mercury lamp type and a mirror-finished metal roll 11 having a diameter of 25.4 cm which were disposed opposite to each other (see FIG. 5), under conditions that the temperature of the mirror-finished metal roll 11 was 90° C. and the integrated amount of light was 80 mJ/cm$^2$. As a result, the wet coat formed of the (H3-1) became a coat in a set-to-touch state (i.e. a state not exhibiting tackiness). Subsequently, the coat in a set-to-touch state formed of the (H3-1) was coated with the (H1-1) by using a die-type applicator so that the wet coat thickness was 23.6 μm (thickness after curing: 10 μm). Subsequently, the coated material was caused to pass through a drying furnace set at an inner temperature of 80° C. at a line speed such that the time required to pass from the inlet to the outlet was one minute. Then, the resultant was treated with a curing apparatus having a UV irradiator 10 of high-pressure mercury lamp type and a mirror-finished metal roll 11 having a diameter of 25.4 cm which were disposed opposite to each other (see FIG. 5), under conditions that the temperature of the mirror-finished metal roll 11 was 60° C. and the integrated amount of light was 500 mJ/cm$^2$ to form a first hard coat, by which a hard coat laminated film was obtained. The hard coat laminated film was subjected to the tests (i) to (xii). The results are presented in Table 4. Incidentally, the "third HC thickness" in the table means the thickness of the third hard coat after curing.

Example 19

The surface on the α1 layer side of the (P-1) was subjected to a corona discharge treatment. The surface subjected to the corona discharge treatment had a wetting index of 64 mN/m. Subsequently, the surface on the α1 layer side was coated with the (H1-1) by using a die-type applicator so that the wet coat thickness was 42.5 μm (thickness after curing: 18 μm). Subsequently, the resultant was passed in a drying furnace with the inner temperature set to 80° C. at a line speed such that the time required to pass through from the inlet to the outlet was 1 minute, and then treated to form a first hard coat with a curing apparatus having a UV irradiator 10 of high-pressure mercury lamp type and a mirror-finished metal roll 11 having a diameter of 25.4 cm which were disposed opposite to each other (see FIG. 5), under conditions that the temperature of the mirror-finished metal roll 11 was 60° C. and the integrated amount of light was 500 mJ/cm$^2$, by which a hard coat laminated film was obtained. In FIG. 5, reference numeral 12 denotes a web, and reference numeral 13 denotes a holding angle. The hard coat laminated film was subjected to the tests (i) to (xii). The results are presented in Table 4.

In addition, the phrase "a coat is in a set-to-touch state (i.e. a state not exhibiting tackiness)" in the present specification means that the coat is in a state in which there is no handling problem even when being directly touched to a web apparatus.

TABLE 1

|  |  | Example 1 | Example 2 | Example 3 | Example 4 | Example 5 | Example 6 |
|---|---|---|---|---|---|---|---|
| First HC coating material (parts by mass) | Type | H1-1 | H1-1 | H1-1 | H1-2 | H1-2 | H1-3 |
|  | A-1 | 100 | 100 | 100 | — | — | — |
|  | A'-1 | — | — | — | 100 | 100 | 90 |
|  | A'-2 | — | — | — | — | — | 10 |
|  | B-1 | 0.25 | 0.25 | 0.25 | 0.25 | 0.25 | 0.25 |
|  | B-2 | 0.042 | 0.042 | 0.042 | 0.042 | 0.042 | 0.042 |
|  | B-3 | — | — | — | — | — | — |
|  | B-4 | — | — | — | — | — | — |
|  | D-1 | — | — | — | — | — | — |
|  | E-1 | 2 | 2 | 2 | 2 | 2 | 2 |
|  | E-2 | 1 | 1 | 1 | 1 | 1 | 1 |
|  | E-3 | 40 | 40 | 40 | 40 | 40 | 40 |
|  | E-4 | 100 | 100 | 100 | 100 | 100 | 100 |
| Second HC coating material (parts by mass) | Type | H2-1 | H2-1 | H2-1 | H2-2 | H2-2 | H2-3 |
|  | A-1 | 100 | 100 | 100 | — | — | — |
|  | A'-1 | — | — | — | 100 | 100 | 100 |
|  | A'-2 | — | — | — | — | — | 10 |
|  | C-1 | 0.5 | 0.5 | 0.5 | 0.5 | 0.5 | 0.5 |
|  | D-1 | — | — | — | — | — | — |
|  | E-1 | 2 | 2 | 2 | 2 | 2 | 2 |
|  | E-2 | 1 | 1 | 1 | 1 | 1 | 1 |
|  | E-3 | 40 | 40 | 40 | 40 | 40 | 40 |
|  | E-4 | 100 | 100 | 100 | 100 | 100 | 100 |
|  | Transparent resin film | P-1 | P-1 | P-1 | P-1 | P-1 | P-1 |
|  | First HC thickness μm | 18 | 15 | 10 | 18 | 10 | 18 |
|  | Second HC thickness μm | 18 | 15 | 10 | 18 | 10 | 18 |
| Evaluation results | Abrasion resistance 1 | A | A | A | A | A | F |
|  | Total light transmittance % | 90.8 | 90.8 | 91.1 | 90.6 | 90.8 | 90.8 |
|  | Haze % | 0.4 | 0.4 | 0.4 | 0.4 | 0.4 | 0.4 |
|  | Yellowness index | 0.4 | 0.4 | 0.4 | 0.4 | 0.4 | 0.4 |
|  | Minimum bending radius mm | 30 | 30 | 30 | 80 | 40 | 30 |
|  | Water contact angle deg | 115 | 115 | 115 | 115 | 115 | 115 |
|  | Abrasion resistance 2 | A | A | A | B | B | B |
|  | Surface appearance | ◎ | ◎ | ◎ | ◎ | ◎ | ◎ |
|  | Cross-cut test | Class 0 | Class 0 | Class 0 | Class 0 | Class 0 | Class 0 |
|  | Cutting processability | ◎-○ | ◎-○ | ◎-○ | ◎-○ | ◎-○ | ◎-○ |
|  | Pencil hardness | 7H | 6H | 5H | 5H | 4H | 4H |
|  | Handling property | ◎ | ◎ | ◎ | X | Δ | Δ |

TABLE 2

|  |  | Example 7 | Example 8 | Example 9 | Example 10 | Example 11 | Example 12 |
|---|---|---|---|---|---|---|---|
| First HC coating material (parts by mass) | Type | H1-4 | H1-5 | H1-6 | H1-7 | H1-8 | H1-9 |
|  | A-1 | — | 100 | 100 | 100 | 100 | 100 |
|  | A'-1 | 75 | — | — | — | — | — |
|  | A'-2 | 25 | — | — | — | — | — |
|  | B-1 | 0.25 | — | 0.05 | 1.2 | 4.8 | — |
|  | B-2 | 0.042 | — | 0.007 | 0.21 | 0.84 | — |
|  | B-3 | — | — | — | — | — | 0.3 |
|  | B-4 | — | — | — | — | — | — |
|  | D-1 | — | — | — | — | — | — |
|  | E-1 | 2 | 2 | 2 | 2 | 2 | 2 |
|  | E-2 | 1 | 1 | 1 | 1 | 1 | 1 |
|  | E-3 | 40 | 40 | 40 | 40 | 40 | 40 |
|  | E-4 | 100 | 100 | 100 | 100 | 100 | 100 |
| Second HC coating material (parts by mass) | Type | H2-4 | H2-1 | H2-1 | H2-1 | H2-1 | H2-1 |
|  | A-1 | — | 100 | 100 | 100 | 100 | 100 |
|  | A'-1 | 75 | — | — | — | — | — |
|  | A'-2 | 25 | — | — | — | — | — |
|  | C-1 | 0.5 | 0.5 | 0.5 | 0.5 | 0.5 | 0.5 |
|  | D-1 | — | — | — | — | — | — |
|  | E-1 | 2 | 2 | 2 | 2 | 2 | 2 |
|  | E-2 | 1 | 1 | 1 | 1 | 1 | 1 |
|  | E-3 | 40 | 40 | 40 | 40 | 40 | 40 |
|  | E-4 | 100 | 100 | 100 | 100 | 100 | 100 |
|  | Transparent resin film | P-1 | P-1 | P-1 | P-1 | P-1 | P-1 |
|  | First HC thickness μm | 18 | 18 | 18 | 18 | 18 | 18 |
|  | Second HC thickness μm | 18 | 18 | 18 | 18 | 18 | 18 |
| Evaluation results | Abrasion resistance 1 | F | F | C | A | A | A |
|  | Total light transmittance % | 91.1 | 91.3 | 91.1 | 90.6 | 90.1 | 90.1 |
|  | Haze % | 0.4 | 0.4 | 0.4 | 0.4 | 0.6 | 0.7 |
|  | Yellowness index | 0.4 | 0.4 | 0.4 | 0.4 | 0.4 | 0.4 |
|  | Minimum bending radius mm | 30 | 30 | 30 | 30 | 30 | 30 |

TABLE 2-continued

|  |  | Example 7 | Example 8 | Example 9 | Example 10 | Example 11 | Example 12 |
|---|---|---|---|---|---|---|---|
|  | Water contact angle deg | 115 | 70 | 114 | 118 | 118 | 118 |
|  | Abrasion resistance 2 | B | — | A | A | A | C |
|  | Surface appearance | ◎ | ◎ | ◎ | ◎ | ○ | ○ |
|  | Cross-cut test | Class 0 | Class 0 | Class 0 | Class 0 | Class 0 | Class 0 |
|  | Cutting processability | ◎-○ | ◎-○ | ◎-○ | ◎-○ | ◎-○ | ◎-○ |
|  | Pencil hardness | 3H | 5H | 6H | 7H | 7H | 6H |
|  | Handling property | ◎ | ◎ | ◎ | ◎ | ◎ | ◎ |

TABLE 3

|  |  | Example 13 | Example 13-2 | Example 13-3 | Example 14 | Example 15 |
|---|---|---|---|---|---|---|
| First HC coating material | Type | H1-10 | H1-12 | H1-13 | H1-11 | H1-1 |
| (parts by mass) | A-1 | 100 | 100 | — | 100 | 100 |
|  | A'-1 | — | — | 90 | — | — |
|  | A'-2 | — | — | 10 | — | — |
|  | B-1 | — | — | — | 0.25 | 0.25 |
|  | B-2 | — | — | — | 0.042 | 0.042 |
|  | B-3 | — | — | — | — | — |
|  | B-4 | 0.3 | — | 0.3 | — | — |
|  | B-5 | — | 0.3 | — | — | — |
|  | D-1 | — | — | — | 20 | — |
|  | E-1 | 2 | 2 | 2 | 2 | 2 |
|  | E-2 | 1 | 1 | 1 | 1 | 1 |
|  | E-3 | 40 | 40 | 40 | 50 | 40 |
|  | E-4 | 100 | 100 | 100 | 110 | 100 |
| Second HC coating material | Type | H2-1 | H2-1 | H2-3 | H2-5 | H2-1 |
| (parts by mass) | A-1 | 100 | 100 | — | 100 | 100 |
|  | A'-1 | — | — | 90 | — | — |
|  | A'-2 | — | — | 10 | — | — |
|  | C-1 | 0.5 | 0.5 | 0.5 | 0.5 | 0.5 |
|  | D-1 | — | — | — | 20 | — |
|  | E-1 | 2 | 2 | 2 | 2 | 2 |
|  | E-2 | 1 | 1 | 1 | 1 | 1 |
|  | E-3 | 40 | 40 | 40 | 50 | 40 |
|  | E-4 | 100 | 100 | 100 | 110 | 100 |
|  | Transparent resin film | P-1 | P-1 | P-1 | P-1 | P-2 |
|  | First HC thickness μm | 18 | 18 | 18 | 18 | 18 |
|  | Second HC thickness μm | 18 | 18 | 18 | 18 | 18 |
| Evaluation results | Abrasion resistance 1 | E | A | F | F | A |
|  | Total light transmittance % | 90.5 | 90.5 | 90.6 | 90.1 | 90.8 |
|  | Haze % | 0.4 | 0.4 | 0.4 | 0.5 | 0.4 |
|  | Yellowness index | 0.4 | 0.4 | 0.4 | 0.4 | 0.4 |
|  | Minimum bending radius mm | 30 | 30 | 30 | 40 | 30 |
|  | Water contact angle deg | 114 | 114 | 114 | 115 | 115 |
|  | Abrasion resistance 2 | D | A | E | E | A |
|  | Surface appearance | ◎ | ◎ | ◎ | ◎ | ◎ |
|  | Cross-cut test | Class 0 | Class 0 | Class 0 | Class 0 | Class 0 |
|  | Cutting processability | ◎-○ | ◎-○ | ◎-○ | ◎-○ | ◎-○ |
|  | Pencil hardness | 6H | 7H | 3H | 7H | 7H |
|  | Handling property | ◎ | ◎ | Δ | X | ◎ |

TABLE 4

|  |  | Example 16 | Example 17 | Example 17-2 | Example 18 | Example 19 |
|---|---|---|---|---|---|---|
| First HC coating material | Type | H1-1 | H1-1 | H1-3 | H1-1 | H1-1 |
| (parts by mass) | A-1 | 100 | 100 | — | 100 | 100 |
|  | A'-1 | — | — | 90 | — | — |
|  | A'-2 | — | — | 10 | — | — |
|  | B-1 | 0.25 | 0.25 | 0.25 | 0.25 | 0.25 |
|  | B-2 | 0.042 | 0.042 | 0.042 | 0.042 | 0.042 |
|  | B-3 | — | — | — | — | — |
|  | B-4 | — | — | — | — | — |
|  | B-5 | — | — | — | — | — |
|  | D-1 | — | — | — | — | — |
|  | E-1 | 2 | 2 | 2 | 2 | 2 |
|  | E-2 | 1 | 1 | 1 | 1 | 1 |
|  | E-3 | 40 | 40 | 40 | 40 | 40 |

TABLE 4-continued

|  |  | Example 16 | Example 17 | Example 17-2 | Example 18 | Example 19 |
|---|---|---|---|---|---|---|
|  | E-4 | 100 | 100 | 100 | 100 | 100 |
| Second HC coating material (parts by mass) | Type | H2-1 | H2-1 | H2-3 | H2-6 | — |
|  | A-1 | 100 | 100 | — | 100 | — |
|  | A'-1 | — | — | 90 | — | — |
|  | A'-2 | — | — | 10 | — | — |
|  | C-1 | 0.5 | 0.5 | 0.5 | 0.5 | — |
|  | D-1 | — | — | — | 140 | — |
|  | E-1 | 2 | 2 | 2 | 2 | — |
|  | E-2 | 1 | 1 | 1 | 1 | — |
|  | E-3 | 40 | 40 | 40 | 80 | — |
|  | E-4 | 100 | 100 | 100 | 200 | — |
| Type of third HC coating material |  | — | — | — | H3-1 | — |
| Transparent resin film |  | P-3 | P-4 | P-4 | P-1 | P-1 |
| First HC thickness μm |  | 18 | 18 | 18 | 10 | 18 |
| Second HC thickness μm |  | 18 | 18 | 18 | 25 | — |
| Third HC thickness μm |  | — | — | — | 15 | — |
| Evaluation results | Abrasion resistance 1 | E | E | F | A | A |
|  | Total light transmittance % | 90.8 | 90.9 | 90.8 | 90.0 | 91.0 |
|  | Haze % | 0.6 | 0.4 | 0.4 | 0.6 | 0.4 |
|  | Yellowness index | 0.8 | 0.4 | 0.4 | 0.4 | 0.4 |
|  | Minimum bending radius mm | 30 | 30 | 30 | 40 | 30 |
|  | Water contact angle deg | 115 | 115 | 115 | 115 | 115 |
|  | Abrasion resistance 2 | B | D | E | A | A |
|  | Surface appearance | ◎ | ◎ | ◎ | ◎ | ◎ |
|  | Cross-cut test | Class 0 | Class 0 | Class 0 | Class 0 | Class 0 |
|  | Cutting processability | ◎-◎ | ◎-◎ | ◎-◎ | ◎-◎ | ◎-◎ |
|  | Pencil hardness | 3H | H | B | 9H | 7H |
|  | Handling property | ◎ | ◎ | Δ | ◎ | ◎ |

From these experimental results, it has been found that the hard coat laminated film of the various embodiments is excellent in abrasion resistance (at least steel wool resistance). It has been found that a preferred hard coat laminated film of the various embodiments is excellent substantially in all of abrasion resistance (at least steel wool resistance, preferably both steel wool resistance and water contact angle after being wiped with cotton), crack resistance, surface appearance, transparency, color tone, surface hardness, and bending resistance and thus exerts physical properties suitable as a display face plate of an image display device having a touch panel function. Incidentally, in the test (i), abrasion resistance 1 (steel wool resistance) test for the hard coat laminated film of Example 14, when another test was performed by changing the initial number of reciprocating rubbings from 9,000 cycles to 1,000 cycles, scratches were already found after reciprocating rubbings of 1,000 cycles.

REFERENCE SIGNS LIST

1 First hard coat
2 First poly(meth)acrylimide-based resin layer (α1)
3 Aromatic polycarbonate-based resin layer (β)
4 Second poly(meth)acrylimide-based resin layer (α2)
5 Second hard coat
6 Coextrusion T die
7 Melted film
8 First mirror-finished roll
9 Second mirror-finished roll
10 UV irradiator
11 Mirror-finished metal roll
12 Web
13 Holding angle

The invention claimed is:

1. A hard coat laminated film sequentially comprising a first hard coat layer and a transparent resin film layer,
wherein the first hard coat layer is a cured product of a coating material that contains 100 parts by mass of (A) a copolymer of (a1) a polyfunctional (meth)acrylate and (a2) a polyfunctional thiol, and 0.01 to 7 parts by mass of (B) a water repellent agent, the coating material containing no inorganic particles, and
(A) the copolymer has a dendrimer structure.

2. A hard coat laminated film sequentially comprising a first hard coat layer and a transparent resin film layer,
wherein the first hard coat layer is a cured product of a coating material that contains (A) a copolymer of (a1) a polyfunctional (meth)acrylate and (a2) a polyfunctional thiol, and (B) a water repellent agent, the coating material containing no inorganic particles,
(A) the copolymer has a dendrimer structure, and the hard coat laminated film satisfies the following property (i):
(i) no scratches are found when the hard coat laminated film is placed on a Gakushin-type tester in accordance with JIS L0849:2013 so that the first hard coat is on the surface side; a steel wool of #0000 is subsequently attached to a rubbing finger of the Gakushin-type tester and a load of 500 g is then applied; and, after 9000 reciprocating rubbings of the surface of the test piece under conditions that the moving speed of the rubbing finger is 300 mm/min and the moving distance is 30 mm, the rubbed portion is visually observed.

3. The hard coat laminated film according to claim 1 sequentially comprising the first hard coat layer, a third hard coat layer, the transparent resin film layer, and a second hard coat layer, wherein the third hard coat layer is a cured product of a coating material containing inorganic particles.

4. The hard coat laminated film according to claim 1, wherein a sulfur content in (A) the copolymer is 0.1 to 12% by mass.

5. The hard coat laminated film according to claim 1, wherein a mass average molecular weight of (A) the copolymer in terms of polystyrene determined from a differential molecular weight distribution curve measured by gel permeation chromatography using tetrahydrofuran as a mobile phase is 5,000 to 200,000.

6. The hard coat laminated film according to claim 1, wherein (B) the water repellent agent contains a (meth) acryloyl group-containing fluorine-based water repellent agent.

7. An article comprising the hard coat laminated film according to claim 1.

8. The hard coat laminated film according to claim 2 sequentially comprising the first hard coat layer, a third hard coat layer, the transparent resin film layer, and a second hard coat layer, wherein the third hard coat layer is a cured product of a coating material containing inorganic particles.

9. The hard coat laminated film according to claim 2, wherein a sulfur content in (A) the copolymer is 0.1 to 12% by mass.

10. The hard coat laminated film according to claim 2, wherein a mass average molecular weight of (A) the copolymer in terms of polystyrene determined from a differential molecular weight distribution curve measured by gel permeation chromatography using tetrahydrofuran as a mobile phase is 5,000 to 200,000.

11. The hard coat laminated film according to claim 2, wherein (B) the water repellent agent contains a (meth) acryloyl group-containing fluorine-based water repellent agent.

12. An article comprising the hard coat laminated film according to claim 2.

13. The hard coat laminated film according to claim 1, wherein the hard coat laminated film sequentially comprises the first hard coat layer, the transparent resin film layer, and a second hard coat layer, wherein the second hard coat layer is a cured product of a coating material containing 100 parts by mass of (A) a copolymer of (a1) a polyfunctional (meth)acrylate and (a2) a polyfunctional thiol, and 0.01 to 10 parts by mass of (C) a leveling agent.

14. The hard coat laminated film according to claim 2, wherein the hard coat laminated film sequentially comprises the first hard coat layer, the transparent resin film layer, and a second hard coat layer, wherein the second hard coat layer is a cured product of a coating material containing (A) a copolymer of (a1) a polyfunctional (meth)acrylate and (a2) a polyfunctional thiol, and (C) a leveling agent.

15. The hard coat laminated film according to claim 1, wherein the hard coat laminated film satisfies the following property (i):
  (i) no scratches are found when the hard coat laminated film is placed on a Gakushin-type tester in accordance with JIS L0849:2013 so that the first hard coat is on the surface side; a steel wool of #0000 is subsequently attached to a rubbing finger of the Gakushin-type tester and a load of 500 g is then applied; and, after 9000 reciprocating rubbings of the surface of the test piece under conditions that the moving speed of the rubbing finger is 300 mm/min and the moving distance is 30 mm, the rubbed portion is visually observed.

16. The hard coat laminated film according to claim 1,
wherein (a1) the polyfunctional (meth)acrylate comprises (a1-1) a polyfunctional (meth)acrylate,
the number of (meth)acryloyl groups in one molecule of (a1-1) the polyfunctional (meth)acrylate is 3 or more, and
(a2) the polyfunctional thiol comprises (a2-1) a polyfunctional thiol,
the number of thiol groups in one molecule of (a2-1) the polyfunctional thiol is 3 or more.

17. The hard coat laminated film according to claim 2,
wherein (a1) the polyfunctional (meth)acrylate comprises (a1-1) a polyfunctional (meth)acrylate,
the number of (meth)acryloyl groups in one molecule of (a1-1) the polyfunctional (meth)acrylate is 3 or more, and
(a2) the polyfunctional thiol comprises (a2-1) a polyfunctional thiol,
the number of thiol groups in one molecule of (a2-1) the polyfunctional thiol is 3 or more.

* * * * *